US011173892B2

(12) United States Patent
Rockwell et al.

(10) Patent No.: US 11,173,892 B2
(45) Date of Patent: Nov. 16, 2021

(54) METHODS AND SYSTEM FOR OPERATING A HYBRID VEHICLE IN A PERFORMANCE MODE

(71) Applicant: Ford Global Technologies, LLC, Dearborn, MI (US)

(72) Inventors: Mark Anthony Rockwell, Royal Oak, MI (US); Kent Hancock, Ann Arbor, MI (US); Christopher Michael Kava, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 864 days.

(21) Appl. No.: 15/786,765

(22) Filed: Oct. 18, 2017

(65) Prior Publication Data
US 2019/0111912 A1  Apr. 18, 2019

(51) Int. Cl.
*B60W 30/182* (2020.01)
*B60W 20/15* (2016.01)
*B60L 15/20* (2006.01)
*B60W 10/24* (2006.01)
*B60L 58/12* (2019.01)
*B60L 50/16* (2019.01)

(52) U.S. Cl.
CPC ............ *B60W 20/15* (2016.01); *B60L 15/20* (2013.01); *B60L 15/2045* (2013.01); *B60L 50/16* (2019.02); *B60L 58/12* (2019.02); *B60W 10/24* (2013.01); *B60L 2240/423* (2013.01); *B60L 2240/441* (2013.01); *B60L 2240/443* (2013.01); *B60L 2260/12* (2013.01); *B60L 2260/26* (2013.01); *B60W 2520/10* (2013.01)

(58) Field of Classification Search
CPC .. B60W 20/15; B60W 10/24; B60W 2520/10; B60W 30/182; B60W 2510/0638; B60W 2510/105; B60W 2510/104; B60W 20/00; B60W 10/26; B60W 10/184; B60W 10/113; B60W 10/08; B60W 10/06; B60L 50/16; B60L 15/20; B60L 58/12; B60L 15/2045; B60L 2260/12; B60L 2240/441; B60L 2260/26; B60L 2240/443; B60L 2240/423
See application file for complete search history.

(56) References Cited

U.S. PATENT DOCUMENTS

| 2008/0132378 | A1* | 6/2008 | Bouchon | B60K 6/48 477/3 |
| 2008/0250786 | A1* | 10/2008 | Robinson | F02D 41/0007 60/602 |
| 2011/0213518 | A1 | 9/2011 | Welchko et al. | |
| 2014/0121929 | A1* | 5/2014 | Murofushi | B60W 50/10 701/70 |

(Continued)

*Primary Examiner* — Christian Chace
*Assistant Examiner* — Jordan S Fei
(74) *Attorney, Agent, or Firm* — David Kelley; McCoy Russell LLP

(57) ABSTRACT

Methods and systems for operating a hybrid vehicle that includes an internal combustion engine, an electric machine, and a transmission are described. In one example, various vehicle operating modes may be entered from a baseline vehicle operating mode and the vehicle operating modes may revert back to the baseline vehicle operating mode in a plurality of stages so that returning to the baseline operating mode may be less noticeable to vehicle occupants.

19 Claims, 7 Drawing Sheets

(56) References Cited

U.S. PATENT DOCUMENTS

| | | |
|---|---|---|
| 2015/0377158 A1 | 12/2015 | Benjey et al. |
| 2016/0280207 A1 | 9/2016 | Rockwell et al. |
| 2016/0304094 A1* | 10/2016 | Johansson ............... F01N 9/002 |
| 2019/0111925 A1* | 4/2019 | Sata ..................... B60W 10/10 |

* cited by examiner

METHODS AND SYSTEM FOR OPERATING A HYBRID VEHICLE IN A PERFORMANCE MODE

FIELD

The present description relates generally to methods and systems for an operating mode of a hybrid vehicle. The methods and systems may be particularly useful for hybrid vehicles that include one or more vehicle operating modes beyond a baseline vehicle operating mode.

BACKGROUND/SUMMARY

A vehicle may include a human/machine interface that allows vehicle occupants to select a vehicle operating mode from a plurality of vehicle operating modes. For example, vehicle occupants may select between a base vehicle operating mode and a performance operating mode. If vehicle occupants select a performance operating mode, one or more vehicle control parameters may be adjusted to enhance vehicle performance. In one example, an upper engine speed threshold may be increased by a predetermined engine speed when performance mode is selected such a maximum engine speed may be adjusted to 6000 RPM for performance mode as compared to 5500 RPM for a baseline vehicle operating mode. Similarly, an upper threshold battery state of charge may be increased from 75% SOC to 80% SOC. By increasing the upper threshold SOC, output duration of a motor in the hybrid powertrain may be increased when the vehicle performance mode is selected. Further, a vehicle suspension stiffness may be increased when the vehicle is engaged in the performance mode as compared to if the vehicle is engaged in a baseline operating mode so that the vehicle may be able to negotiate turns with less body sway.

Operating the vehicle in performance mode may enhance a vehicle driving experience, but it may also accelerate degradation of some vehicle systems. For example, increasing battery SOC threshold limits may reduce battery life and an increased engine speed threshold may increase thermal stress on some engine components. Further, a performance mode may increase vehicle energy consumption. Therefore, it may be desirable to provide a way of permitting a performance mode while mitigating the possibility of vehicle degradation. Further, it may be desirable to reduce the possibility of vehicle degradation after a vehicle occupant selects a vehicle performance mode in a way that is less noticeable to vehicle occupants.

The inventors herein have recognized the above-mentioned issues and have developed a vehicle operating method, comprising: substantially simultaneously activating a plurality of vehicle control parameter staging groups via a controller and operating a vehicle responsive to the plurality of vehicle control parameter staging groups in response to a vehicle mode being selected; and via the controller, deactivating the plurality of vehicle control parameter staging groups asynchronously and operating the vehicle responsive to baseline control parameters responsive to one or more conditions being met.

By grouping vehicle control parameters and staging deactivation of the vehicle control parameters, it may be possible to provide the technical result of automatically exiting a vehicle control mode in a staged sequence so that the possibility of vehicle component degradation due to operating in a vehicle mode for an extended duration may be reduced. Further, the grouping of vehicle control parameters and staging of deactivating the vehicle control parameters may be sequenced such that reverting back to a baseline vehicle mode may be less noticeable to vehicle occupants.

The present description may provide several advantages. For example, the approach may reduce vehicle component degradation while providing for operating the vehicle in various types of performance modes. Further, the approach may reduce the possibility of vehicle occupants noticing switching between vehicle modes. Further still, the approach may provide different levels of a vehicle mode based on an amount of time the vehicle operates in the vehicle mode.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 4:
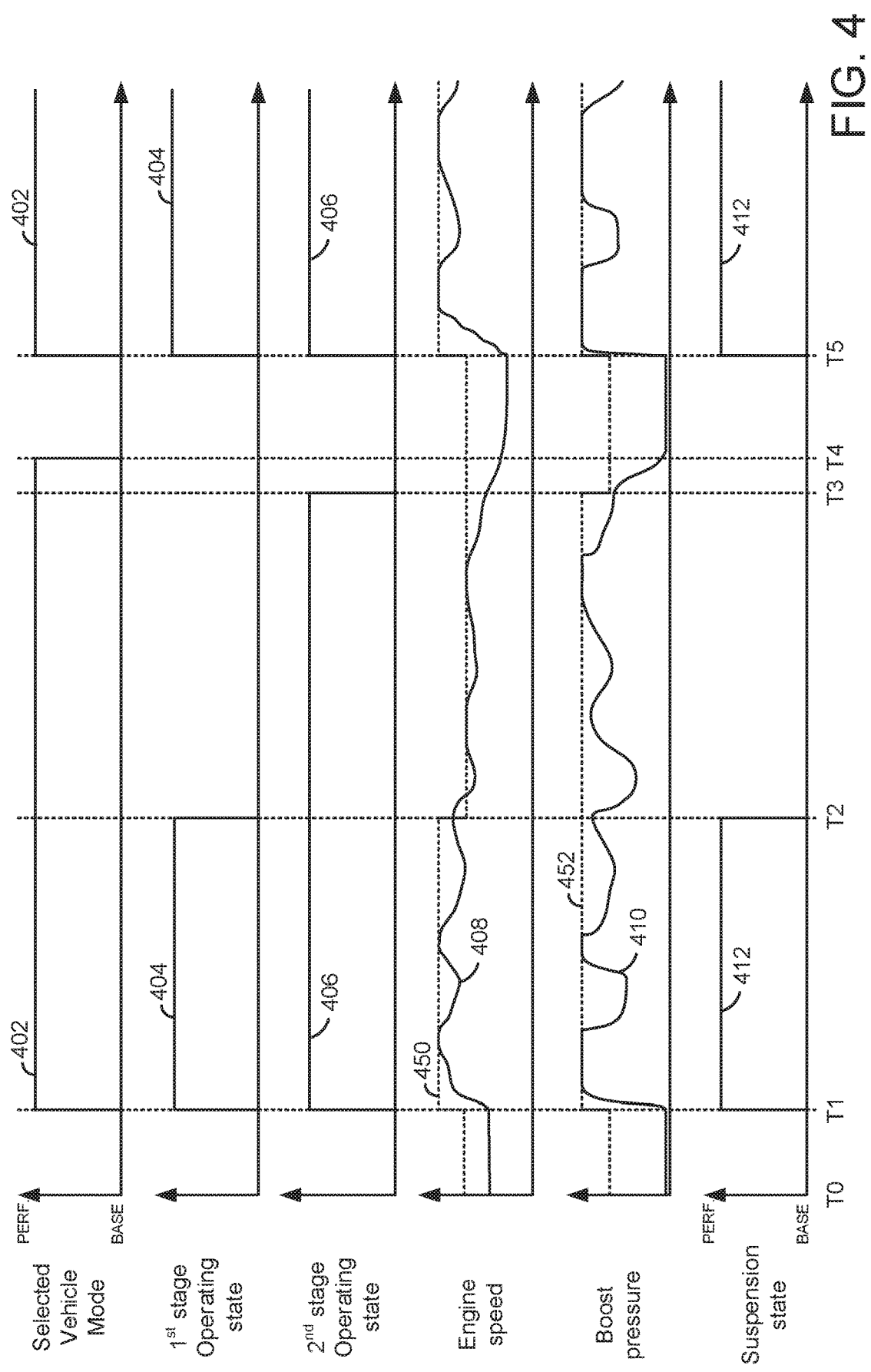
FIG. 4 is a first prophetic vehicle operating sequence.
Figure 5:
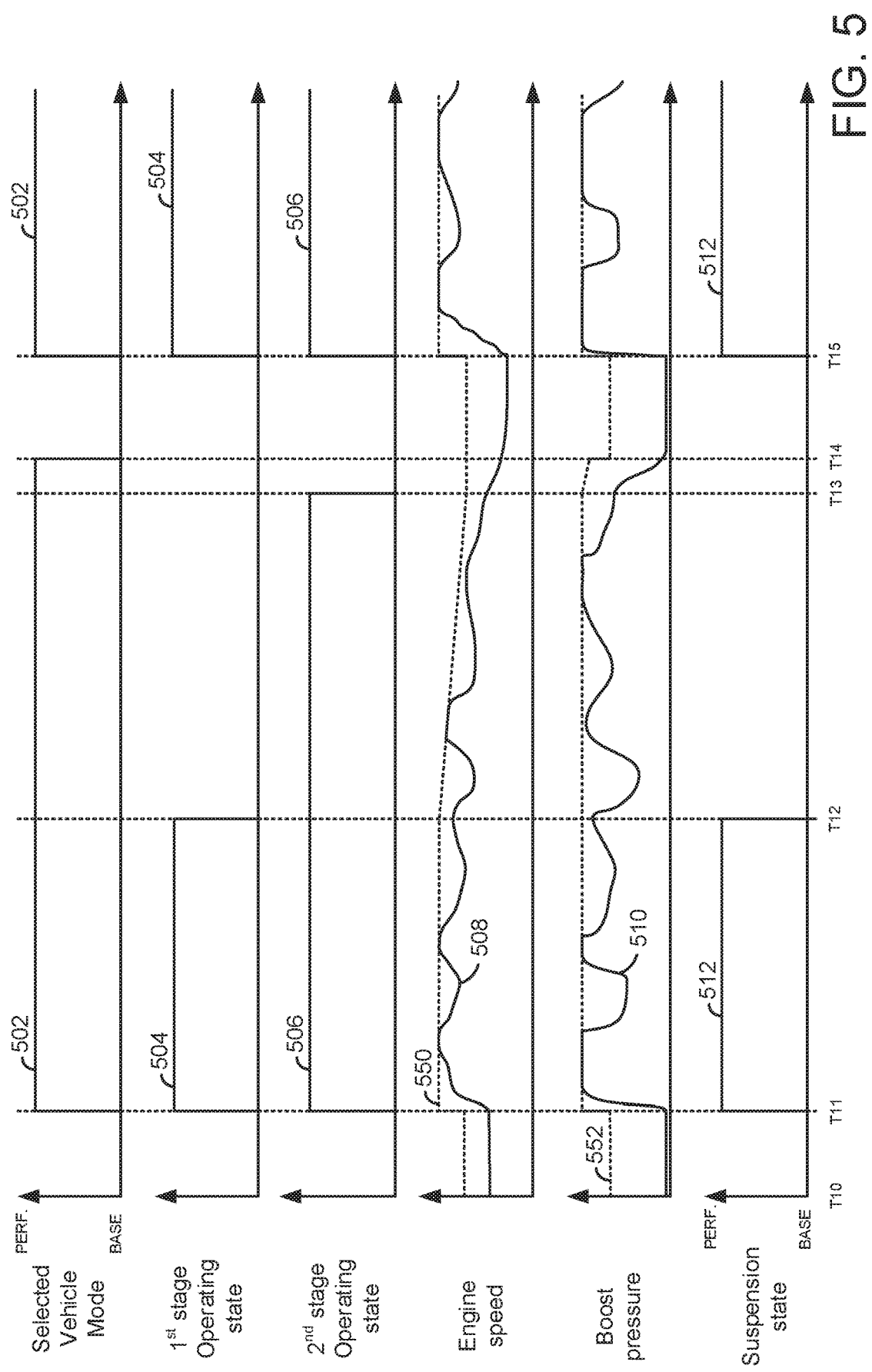
FIG. 5, is a second prophetic vehicle operating sequence.
Figure 6:
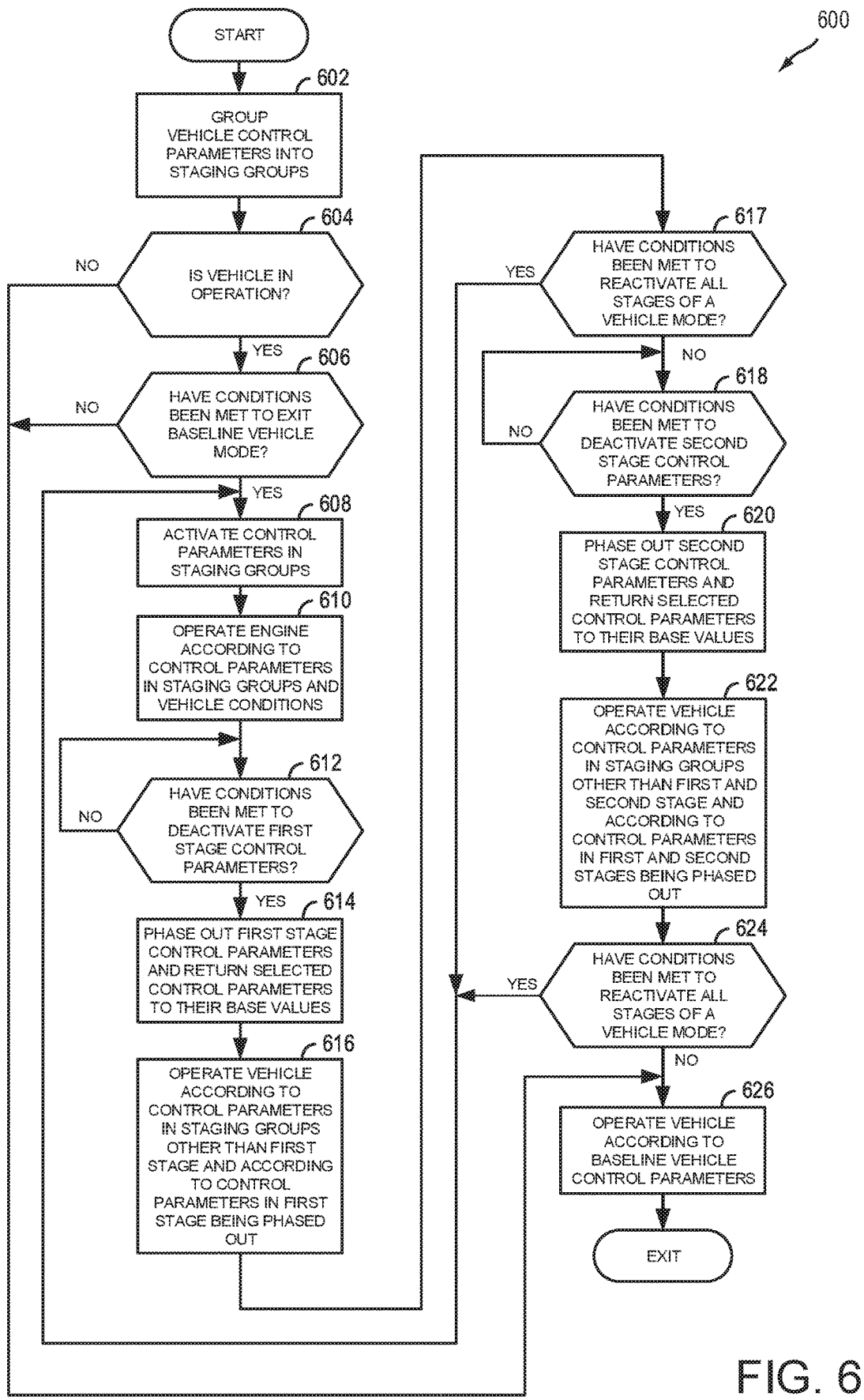
FIG. 6 is a flowchart of a method to operate a hybrid vehicle.

The following description relates to systems and methods for operating a hybrid vehicle. FIGS. 1A-3 show an example hybrid vehicle system that includes a driveline with a motor, an integrated starter/generator, a dual clutch transmission, and a rear drive unit with an electric machine that is positioned downstream of the dual clutch transmission. FIGS. 4 and 5 show prophetic vehicle operating sequences for improving vehicle mode transitions. FIG. 6 is a flowchart of an example method for operating a hybrid vehicle. It should be noted that although a hybrid vehicle is disclosed, the methods and systems described herein may also be suitable for conventional gasoline or diesel vehicles.

Figure 1A:
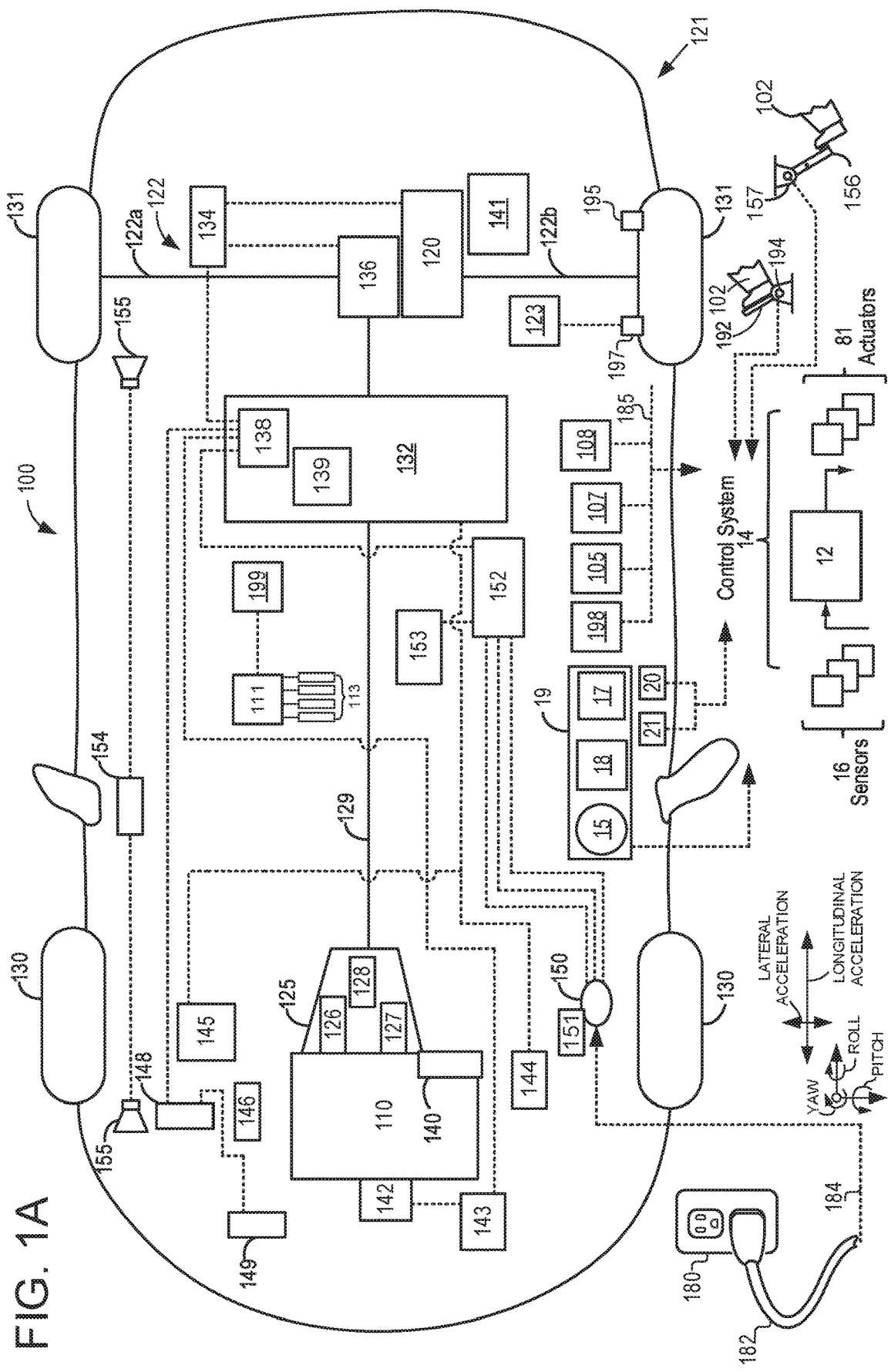
FIG. 1A is a schematic diagram of a hybrid vehicle.

FIG. 1A illustrates an example vehicle propulsion system 100 for vehicle 121. Vehicle propulsion system 100 includes at least two power sources including an internal combustion engine 110 and an electric machine 120. Electric machine 120 may be configured to utilize or consume a different energy source than engine 110. For example, engine 110 may consume liquid fuel (e.g. gasoline) to produce an engine output while electric machine 120 may consume electrical energy to produce an electric machine output. As such, a vehicle with propulsion system 100 may be referred to as a hybrid electric vehicle (HEV). Throughout the description of FIG. 1A, mechanical connections between various components is illustrated as solid lines, whereas electrical connections between various components are illustrated as dashed lines.

Vehicle propulsion system 100 has a front axle (not shown) and a rear axle 122. In some examples, rear axle may comprise two half shafts, for example first half shaft 122a, and second half shaft 122b. Vehicle propulsion system 100 further has front wheels 130 and rear wheels 131. The rear axle 122 is coupled to electric machine 120 and to transmission 125 via driveshaft 129. The rear axle 122 may be driven either purely electrically and exclusively via electric machine 120 (e.g., electric only drive or propulsion mode, engine is not combusting air and fuel or rotating), in a hybrid fashion via electric machine 120 and engine 110 (e.g., parallel mode), or exclusively via engine 110 (e.g., engine only propulsion mode), in a purely combustion engine-operated fashion. Rear drive unit 136 may transfer power from engine 110 or electric machine 120, to axle 122, resulting in rotation of drive wheels 131. Rear drive unit 136 may include a gear set and one or more clutches to decouple transmission 125 and electric machine 120 from wheels 131. Rear drive unit 136 may include electric machine 120 and axle 122.

A transmission 125 is illustrated in FIG. 1A as connected between engine 110, and electric machine 120 assigned to rear axle 122. In one example, transmission 125 is a dual clutch transmission (DCT). In an example wherein transmission 125 is a DCT, DCT may include a first clutch 126, a second clutch 127, and a gear box 128. DCT 125 outputs torque to drive shaft 129 to supply torque to wheels 131. As will be discussed in further detail below with regard to FIG. 2, transmission 125 may shift gears by selectively opening and closing first clutch 126 and second clutch 127.

Electric machine 120 may receive electrical power from onboard energy storage device 132. Furthermore, electric machine 120 may provide a generator function to convert engine output or the vehicle's kinetic energy into electrical energy, where the electrical energy may be stored at energy storage device 132 for later use by the electric machine 120 or integrated starter/generator 142. A first inverter system controller (ISC1) 134 may convert alternating current generated by electric machine 120 to direct current for storage at the energy storage device 132 and vice versa.

In some examples, energy storage device 132 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 14 may communicate with one or more of engine 110, electric machine 120, energy storage device 132, integrated starter/generator 142, transmission 125, etc. Control system 14 may receive sensory feedback information from one or more of engine 110, electric machine 120, energy storage device 132, integrated starter/generator 142, transmission 125, etc. Further, control system 14 may send control signals to one or more of engine 110, electric machine 120, energy storage device 132, transmission 125, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source 180 (e.g., a stationary power grid) residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 132 from power source 180 via an electrical energy transmission cable 182. During a recharging operation of energy storage device 132 from power source 180, electrical transmission cable 182 may electrically couple energy storage device 132 and power source 180. In some examples, power source 180 may be connected at inlet port 150. Furthermore, in some examples, a charge status indicator 151 may display a charge status of energy storage device 132.

In some examples, electrical energy from power source 180 may be received by charger 152. For example, charger 152 may convert alternating current from power source 180 to direct current (DC), for storage at energy storage device 132. Furthermore, a DC/DC converter 153 may convert a source of direct current from charger 152 from one voltage to another voltage. In other words, DC/DC converter 153 may act as a type of electric power converter.

While the vehicle propulsion system is operated to propel the vehicle, electrical transmission cable 182 may be disconnected between power source 180 and energy storage device 132. Control system 14 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 132 from a power source that does not comprise part of the vehicle. In this way, electric machine 120 may propel the vehicle by utilizing an energy source other than the fuel utilized by engine 110.

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

Vehicle propulsion system 100 may also include an ambient temperature/humidity sensor 198, and sensors dedicated to indicating the occupancy-state of the vehicle, for example onboard cameras 105, seat load cells 107, and door sensing technology 108. Vehicle system 100 may also include inertial sensors 199. Inertial sensors 199 may comprise one or more of the following: longitudinal, latitudinal, vertical, yaw, roll, and pitch sensors (e.g., accelerometers). Axes of yaw, pitch, roll, lateral acceleration, and longitudinal acceleration are as indicated. As one example, inertial sensors 199 may couple to the vehicle's restraint control module (RCM) (not shown), the RCM comprising a subsystem of control system 14. The control system may adjust engine output and/or the wheel brakes to increase vehicle stability in response to sensor(s) 199. In another example, the control system may adjust an active suspension system 111 responsive to input from inertial sensors 199. Active suspension system 111 may comprise an active suspension system having hydraulic, electrical, and/or mechanical devices, as well as active suspension systems that control the vehicle height on an individual corner basis e.g., four corner independently controlled vehicle heights), on an axle-by-axle basis (e.g., front axle and rear axle vehicle heights), or a single vehicle height for the entire vehicle. Further, active suspension system 111 may adjust suspension stiffness via adjusting compliance of vehicle variable dampeners 113. Data from inertial sensor 199 may also be communicated to controller 12, or alternatively, sensors 199 may be electrically coupled to controller 12.

One or more tire pressure monitoring sensors (TPMS) may be coupled to one or more tires of wheels in the vehicle. For example, FIG. 1A shows a tire pressure sensor 197 coupled to wheel 131 and configured to monitor a pressure in a tire of wheel 131. While not explicitly illustrated, it may be understood that each of the four tires indicated in FIG. 1A may include one or more tire pressure sensor(s) 197. Furthermore, in some examples, vehicle propulsion system 100 may include a pneumatic control unit 123. Pneumatic control unit may receive information regarding tire pressure from tire pressure sensor(s) 197, and send said tire pressure information to control system 14. Based on said tire pressure information, control system 14 may command pneumatic control unit 123 to inflate or deflate tire(s) of the vehicle wheels. While not explicitly illustrated, it may be understood that pneumatic control unit 123 may be used to inflate or deflate tires associated with any of the four wheels illustrated in FIG. 1A. For example, responsive to an indication of a tire pressure decrease, control system 14 may command pneumatic control system unit 123 to inflate one or more tire(s). Alternatively, responsive to an indication of a tire pressure increase, control system 14 may command pneumatic control system unit 123 to deflate tire(s) one or more tires. In both examples, pneumatic control system unit 123 may be used to inflate or deflate tires to an optimal tire pressure rating for said tires, which may prolong tire life.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include an accelerometer 20. Vehicle propulsion system 100 may further include an inclinometer 21.

Vehicle propulsion system 100 may further include a starter 140. Starter 140 may comprise an electric motor, hydraulic motor, etc., and may be used to rotate engine 110 so as to initiate engine 110 operation under its own power.

Vehicle propulsion system 100 may further include a brake system control module (BSCM) 141. In some examples, BSCM 141 may comprise an anti-lock braking system or anti-skid braking system, such that wheels (e.g. 130, 131) may maintain tractive contact with the road surface according to driver inputs while braking, which may thus prevent the wheels from locking up, to prevent skidding. In some examples, BSCM may receive input from wheel speed sensors 195.

Vehicle propulsion system 100 may further include a belt integrated starter generator (BISG) 142. BISG may produce electric power when the engine 110 is in operation, where the electrical power produced may be used to supply electric devices and/or to charge the onboard storage device 132. As indicated in FIG. 1A, a second inverter system controller (ISC2) 143 may receive alternating current from BISG 142, and may convert alternating current generated by BISG 142 to direct current for storage at energy storage device 132. Integrated starter/generator 142 may also provide torque to engine 110 during engine starting or other conditions to supplement engine torque.

Vehicle propulsion system 100 may further include a power distribution box (PDB) 144. PDB 144 may be used for routing electrical power throughout various circuits and accessories in the vehicle's electrical system.

Vehicle propulsion system 100 may further include a high current fuse box (HCFB) 145, and may comprise a variety of fuses (not shown) used to protect the wiring and electrical components of vehicle propulsion system 100.

Vehicle propulsion system 100 may further include a motor electronics coolant pump (MECP) 146. MECP 146 may be used to circulate coolant to diffuse heat generated by at least electric machine 120 of vehicle propulsion system 100, and the electronics system. MECP may receive electrical power from onboard energy storage device 132, as an example.

Controller 12 may comprise a portion of a control system 14. Control system 14 is shown receiving information from a plurality of sensors 16 (various examples of which are described herein) and sending control signals to a plurality of actuators 81 (various examples of which are described herein). As one example, sensors 16 may include tire pressure sensor(s) 197, wheel speed sensor(s) 195, ambient temperature/humidity sensor 198, onboard cameras 105, seat load cells 107, door sensing technology 108, inertial sensors 199, etc. In some examples, sensors associated with engine 110, transmission 125, electric machine 120, etc., may communicate information to controller 12, regarding various states of engine, transmission, and motor operation, as will be discussed in further detail with regard to FIG. 1B, FIG. 2 and FIG. 3.

Vehicle propulsion system 100 may further include a positive temperature coefficient (PTC) heater 148. As an example, PTC heater 148 may comprise a ceramic material such that when resistance is low, the ceramic material may accept a large amount of current, which may result in a rapid warming of the ceramic element. However, as the element warms and reaches a threshold temperature, the resistance may become very large, and as such, may not continue to produce much heat. As such, PTC heater 148 may be self-regulating, and may have a good degree of protection from overheating.

Vehicle propulsion system 100 may further include an air conditioning compressor module 149, for controlling an electric air conditioning compressor (not shown).

Vehicle propulsion system 100 may further include a vehicle audible sounder for pedestrians (VASP) 154. For example, VASP 154 may be configured to produce audible sounds via sounders 155. In some examples, audible sounds produced via VASP 154 communicating with sounders 155 may be activated responsive to a vehicle operator triggering the sound, or automatically, responsive to engine speed below a threshold or detection of a pedestrian.

Vehicle propulsion system 100 may also include an onboard navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include a human/machine interface 15 via which the vehicle operator may adjust the operating status of the vehicle. Specifically, the human/machine interface 15 may be configured to initiate and/or terminate operation of the vehicle driveline (e.g., engine 110, BISG 142, DCT 125, and electric machine 130) based on human input. Various examples of the operator ignition interface 15 may include interfaces that require a physical apparatus, such as an active key, that may be inserted into the operator ignition interface 15 to start the engine 110 and turn on the vehicle, or may be removed to shut down the engine 110 and turn off the vehicle. Other examples may include a passive key that is communicatively coupled to the operator ignition interface 15. The passive key may be configured as an electronic key fob or a smart key that does not have to be inserted or removed from the ignition interface 15 to operate the vehicle engine 110. Rather, the passive key may need to be located inside or proximate to the vehicle (e.g., within a threshold distance of the vehicle). Still other examples may additionally or optionally use a start/stop button that is manually pressed by the operator to start or shut down the engine 110 and turn the vehicle on or off. In other examples, a remote engine start may be initiated remote computing device (not shown), for example a cellular telephone, or smartphone-based system where a user's cellular telephone sends data to a server and the server communicates with the vehicle controller 12 to start the engine.

Figure 1B:
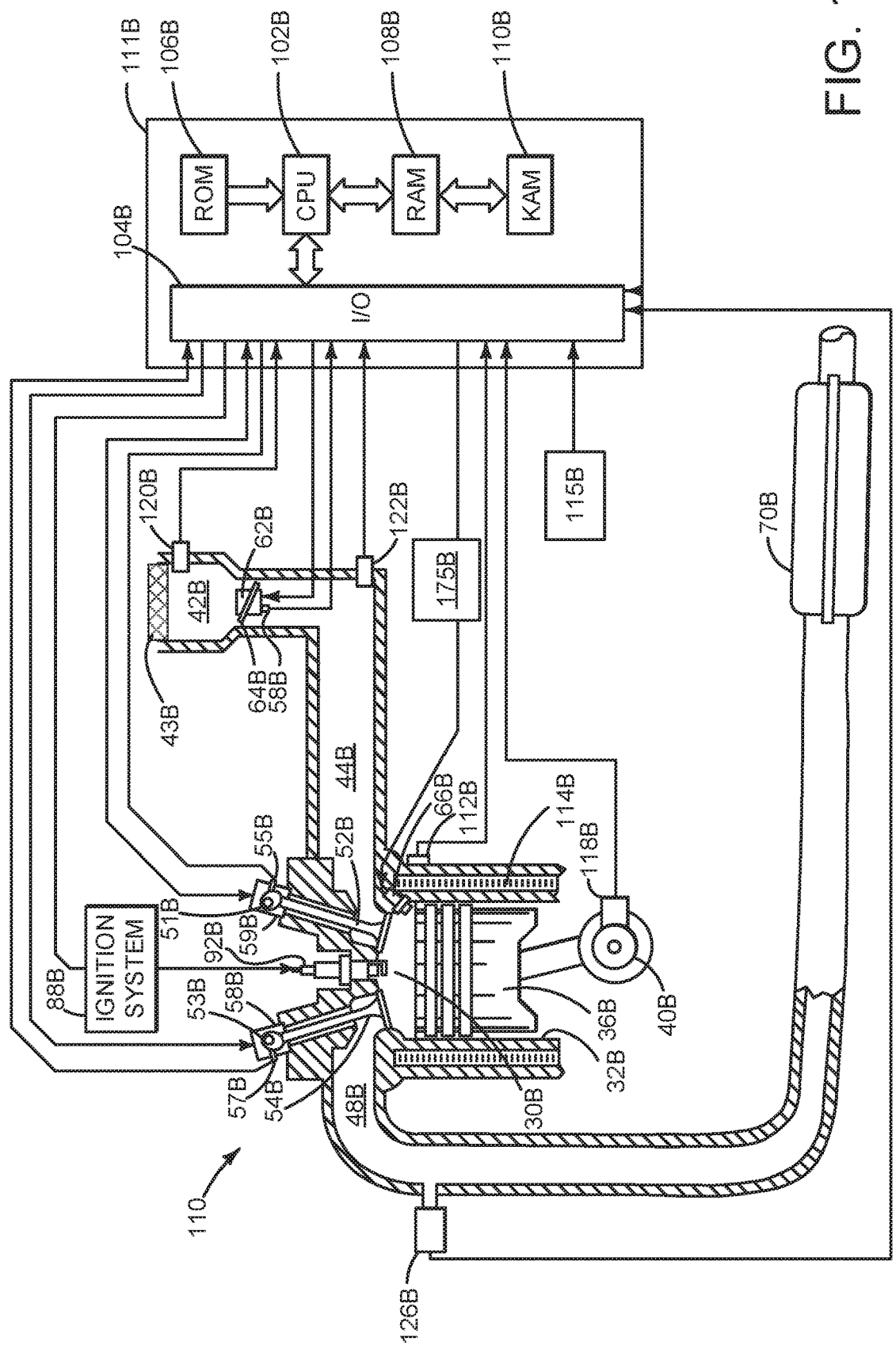
FIG. 1B is a sketch of an engine of the hybrid vehicle.

Referring to FIG. 1B, a detailed view of internal combustion engine 110, comprising a plurality of cylinders, one cylinder of which is shown in FIG. 1B, is shown. Engine 110 is controlled by electronic engine controller 111B. Engine 110 includes combustion chamber 30B and cylinder walls 32B with piston 36B positioned therein and connected to crankshaft 40B. Combustion chamber 30B is shown communicating with intake manifold 44B and exhaust manifold 48B via respective intake valve 52B and exhaust valve 54B. Each intake and exhaust valve may be operated by an intake cam 51B and an exhaust cam 53B. The position of intake cam 51B may be determined by intake cam sensor 55B. The position of exhaust cam 53B may be determined by exhaust cam sensor 57B. Intake cam 51B and exhaust cam 53B may be moved relative to crankshaft 40B. Intake valves may be deactivated and held in a closed state via intake valve deactivating mechanism 59B. Exhaust valves may be deactivated and held in a closed state via exhaust valve deactivating mechanism 58B.

Fuel injector 66B is shown positioned to inject fuel directly into cylinder 30B, which is known to those skilled in the art as direct injection. Alternatively, fuel may be injected to an intake port, which is known to those skilled in the art as port injection. Fuel injector 66B delivers liquid fuel in proportion to the pulse width of signal from engine controller 111B. Fuel is delivered to fuel injector 66B by a fuel system 175B, which includes a tank and pump. In addition, intake manifold 44B is shown communicating with optional electronic throttle 62B (e.g., a butterfly valve) which adjusts a position of throttle plate 64B to control air flow from air filter 43B and air intake 42B to intake manifold 44B. Throttle 62B regulates air flow from air filter 43B in engine air intake 42B to intake manifold 44B. In some examples, throttle 62B and throttle plate 64B may be positioned between intake valve 52B and intake manifold 44B such that throttle 62B is a port throttle.

Distributorless ignition system 88B provides an ignition spark to combustion chamber 30B via spark plug 92B in response to engine controller 111B. Universal Exhaust Gas Oxygen (UEGO) sensor 126B is shown coupled to exhaust manifold 48B upstream of catalytic converter 70B in a direction of exhaust flow. Alternatively, a two-state exhaust gas oxygen sensor may be substituted for UEGO sensor 126B.

Converter 70B can include multiple catalyst bricks, in one example. In another example, multiple emission control devices, each with multiple bricks, can be used. Converter 70B can be a three-way type catalyst in one example.

Engine controller 111B is shown in FIG. 1B as a conventional microcomputer including: microprocessor unit 102B, input/output ports 104B, read-only memory 106B (e.g., non-transitory memory), random access memory 108B, keep alive memory 110B, and a conventional data bus. Other controllers mentioned herein may have a similar processor and memory configuration. Engine controller 111B is shown receiving various signals from sensors coupled to engine 110, in addition to those signals previously discussed, including: engine coolant temperature (ECT) from temperature sensor 112B coupled to cooling sleeve 114B; a measurement of engine manifold pressure (MAP) from pressure sensor 122B coupled to intake manifold 44B; an engine position sensor from a Hall effect sensor 118B sensing crankshaft 40B position; a measurement of air mass entering the engine from sensor 120B; and a measurement of throttle position from sensor 58B. Barometric pressure may also be sensed (sensor not shown) for processing by engine controller 111B. In a preferred aspect of the present description, engine position sensor 118B produces a predetermined number of equally spaced pulses every revolution of the crankshaft from which engine speed (RPM) can be determined. Engine controller 111B may receive input from human/machine interface 115B (e.g., pushbutton or touch screen display).

During operation, each cylinder within engine 110 typically undergoes a four stroke cycle: the cycle includes the intake stroke, compression stroke, expansion stroke, and exhaust stroke. During the intake stroke, generally, the exhaust valve 54B closes and intake valve 52B opens. Air is introduced into combustion chamber 30B via intake manifold 44B, and piston 36B moves to the bottom of the cylinder so as to increase the volume within combustion chamber 30B. The position at which piston 36B is near the bottom of the cylinder and at the end of its stroke (e.g. when combustion chamber 30B is at its largest volume) is typically referred to by those of skill in the art as bottom dead center (BDC). During the compression stroke, intake valve 52B and exhaust valve 54B are closed. Piston 36B moves toward the cylinder head so as to compress the air within combustion chamber 30B. The point at which piston 36B is at the end of its stroke and closest to the cylinder head (e.g. when combustion chamber 30B is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92B, resulting in combustion. During the expansion stroke, the expanding gases push piston 36B back to BDC. Crankshaft 40B converts piston movement into a rotational torque of the rotary shaft. Finally, during the exhaust stroke, the exhaust valve 54B opens to release the combusted air-fuel mixture to exhaust manifold 48B and the piston returns to TDC. Note that the above is shown merely as an example, and that intake and exhaust valve opening and/or closing timings may vary, such as to provide positive or negative valve overlap, late intake valve closing, or various other examples.

Figure 2:
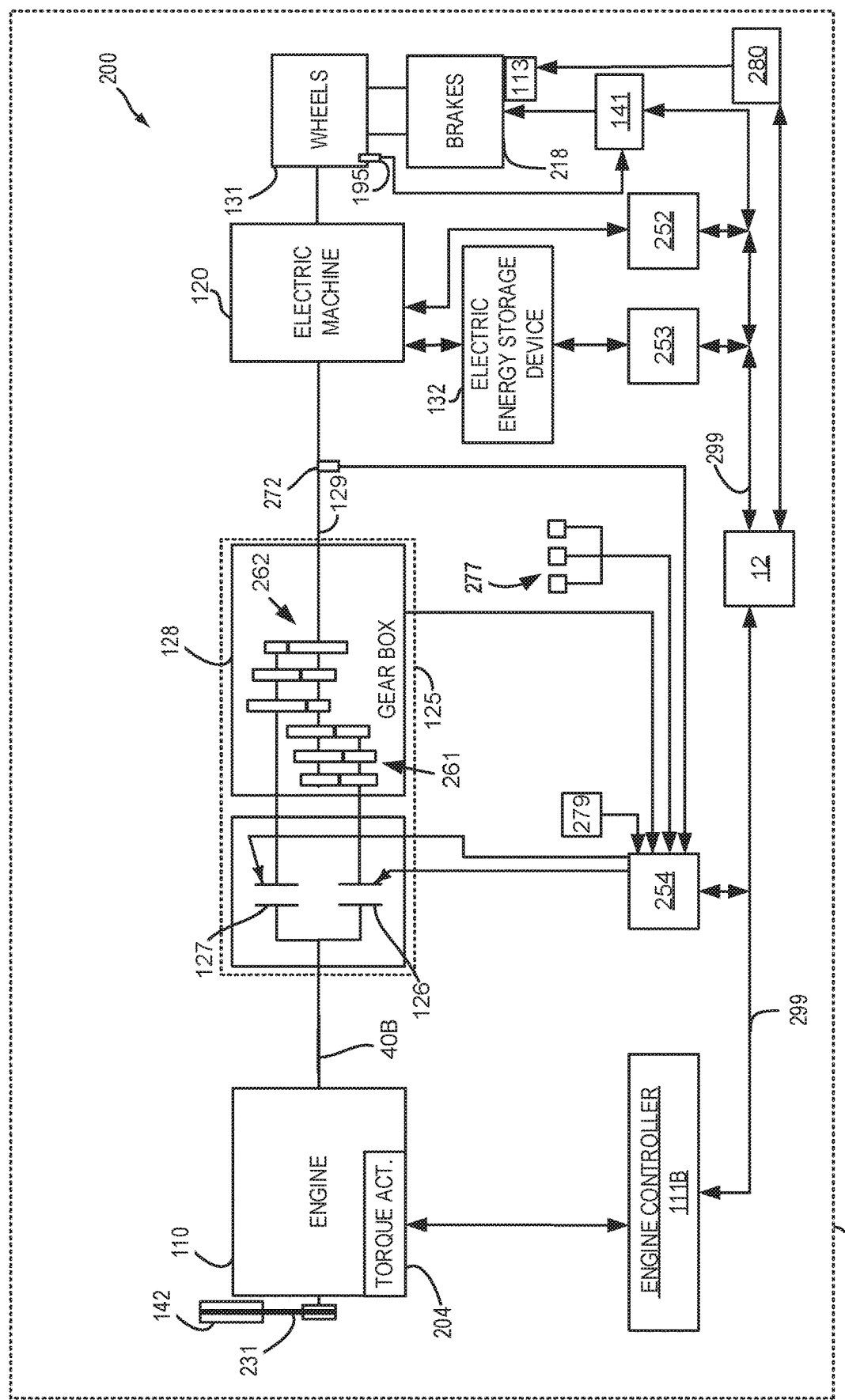
FIG. 2 is a schematic diagram of the hybrid vehicle including controllers of various driveline components.

FIG. 2 is a block diagram of vehicle 121 including a powertrain or driveline 200. The powertrain of FIG. 2 includes engine 110 shown in FIGS. 1A-B. Other components of FIG. 2 that are common with FIG. 1A are indicated by like numerals, and will be discussed in detail below. Powertrain 200 is shown including vehicle system controller 12, engine controller 111B, electric machine controller 252, transmission controller 254, energy storage device controller 253, and brake controller 141 (also referred to herein as brake system control module). The controllers may communicate over controller area network (CAN) 299. Each of the controllers may provide information to other controllers such as torque output limits (e.g. torque output of the device or component being controlled not to be exceeded), toque input limits (e.g. torque input of the device or component being controlled not to be exceeded), torque output of the device being controlled, sensor an actuator data, diagnostic information (e.g. information regarding a degraded transmission, information regarding a degraded engine, information regarding a degraded electric machine, information regarding degraded brakes). Further, the vehicle system controller 12 may provide commands to engine controller 111B, electric machine controller 252, transmission controller 254, and brake controller 141 to achieve driver input requests and other requests that are based on vehicle operating conditions.

For example, in response to a driver releasing an accelerator pedal and vehicle speed decreasing, vehicle system controller 12 may request a desired wheel torque or wheel power level to provide a desired rate of vehicle deceleration. The desired wheel torque may be provided by vehicle system controller 12 requesting a first braking torque from electric machine controller 252 and a second braking torque from brake controller 141, the first and second torques providing the desired braking torque at vehicle wheels 131.

In other examples, the partitioning of controlling powertrain devices may be partitioned differently than is illustrated in FIG. 2. For example, a single controller may take the place of vehicle system controller 12, engine controller 111B, electric machine controller 252, transmission controller 254, and brake controller 141. Alternatively, the vehicle system controller 12 and the engine controller 111B may be a single unit while the electric machine controller 252, the transmission controller 254, and the brake controller 141 may be standalone controllers.

In this example, powertrain 200 may be powered by engine 110 and electric machine 120. In other examples, engine 110 may be omitted. Engine 110 may be started with an engine starter (e.g. 140), via belt integrated starter/generator (BISG) 142, or via electric machine 120. In some examples, BISG may be coupled directly to the engine crankshaft at either end (e.g., front or back) of the crankshaft. Electric machine 120 (e.g. high voltage electric machine, operated with greater than 30 volts), is also referred to herein as electric machine, motor, and/or generator. Further, torque of engine 110 may be adjusted via a torque actuator 204, such as a fuel injector, throttle, etc.

BISG 142 is mechanically coupled to engine 110 via belt 231. BISG 142 may be coupled to a crankshaft (not shown) or a camshaft (not shown). BISG 142 may operate as a motor when supplied with electrical power via electric energy storage device 132, also referred to herein as onboard energy storage device 132. BISG 142 may additionally operate as a generator supplying electrical power to electric energy storage device 132.

Driveline 200 includes engine 110 mechanically coupled to dual clutch transmission (DCT) 125 via crank shaft 40B. DCT 125 includes a first clutch 126, a second clutch 127, and a gear box 128. DCT 125 outputs torque to shaft 129, to supply torque to vehicle wheels 131. Transmission controller 254 selectively opens and closes first clutch 126 and second clutch 127 to shift DCT 125.

Gear box 128 may include a plurality of gears. One clutch, for example first clutch 126 may control odd gears 261 (e.g. first, third, fifth, and reverse), while another clutch, for example second clutch 127, may control even gears 262 (e.g. second, fourth, and sixth). By utilizing such an arrangement, gears can be changed without interrupting power flow from the engine 110 to dual clutch transmission 125.

Electric machine 120 may be operated to provide torque to powertrain 200 or to convert powertrain torque into electrical energy to be stored in electrical energy storage device 132 in a regeneration mode. Additionally, electric machine 120 may convert the vehicle's kinetic energy into electrical energy for storage in electric energy storage device 132. Electric machine 120 is in electrical communication with energy storage device 132. Electric machine 120 has a higher output torque capacity than starter (e.g. 140) depicted in FIG. 1A, or BISG 142. Further, electric machine 120 directly drives powertrain 200, or is directly driven by powertrain 200.

Electrical energy storage device 132 (e.g. high voltage battery or power source) may be a battery, capacitor, or inductor. Electric machine 120 is mechanically coupled to wheels 131 and dual clutch transmission via a gear set in rear drive unit 136 (shown in FIG. 1A). Electric machine 120 may provide a positive torque or a negative torque to powertrain 200 via operating as a motor or generator as instructed by electric machine controller 252.

Further, a frictional force may be applied to wheels 131 by engaging friction wheel brakes 218. In one example, friction wheel brakes 218 may be engaged in response to the driver pressing his foot on a brake pedal (e.g. 192) and/or in response to instructions within brake controller 141. Further, brake controller 141 may apply brakes 218 in response to information and/or requests made by vehicle system controller 12. In the same way, a frictional force may be reduced to wheels 131 by disengaging wheel brakes 218 in response to the driver releasing his foot from a brake pedal, brake controller instructions, and/or vehicle system controller instructions and/or information. For example, vehicle brakes may apply a frictional force to wheels 131 via controller 141 as part of an automated engine stopping procedure.

Vehicle system controller 12 may also communicate vehicle suspension settings to active suspension system controller 280. The suspension (e.g. 111) of vehicle 121 may be adjusted to critically damp, over damp, or under damp the vehicle suspension via variable dampeners 113.

Accordingly, torque control of the various powertrain components may be supervised by vehicle system controller 12 with local torque control for the engine 110, transmission 125, electric machine 120, and brakes 218 provided via engine controller 111B, electric machine controller 252, transmission controller 254, and brake controller 141.

As one example, an engine torque output may be controlled by adjusting a combination of spark timing, fuel pulse width, fuel pulse timing, and/or air charge, by controlling throttle (e.g. 62B) opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from electric machine 120 by adjusting current flowing to and from field and/or armature windings of electric machine 120 as is known in the art.

Transmission controller 254 may receive transmission output shaft torque from torque sensor 272. Alternatively, sensor 272 may be a position sensor or torque and position sensors. If sensor 272 is a position sensor, transmission controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 111B, and vehicle system controller 12, may also receive additional transmission information from sensors 277, which may include but are not limited to pump output line pressure sensors, transmission hydraulic pressure sensors (e.g., gear clutch fluid pressure sensors), motor temperature sensors, BISG temperatures, shift selector position sensors, synchronizer position sensors, and ambient temperature sensors. Transmission controller may also receive a requested transmission state (e.g., requested gear or park mode) from shift selector 279, which may be a lever, switches, or other device.

Brake controller 141 receives wheel speed information via wheel speed sensor 195 and braking requests from vehicle system controller 12. Brake controller 141 may also receive brake pedal position information from brake pedal sensor (e.g. 157) shown in FIG. 1A directly or over CAN 299. Brake controller 141 may provide braking responsive to a wheel torque command from vehicle system controller 12. Brake controller 141 may also provide anti-lock and vehicle stability braking to improve vehicle braking and stability. As such, brake controller 141 may provide a wheel torque limit (e.g., a threshold negative wheel torque not to be exceeded) to the vehicle system controller 12 so that negative motor torque does not cause the wheel torque limit to be exceeded. For example, if controller 12 issues a negative wheel torque limit of 50 Newton-meters (N-m), motor torque may be adjusted to provide less than 50 N-m (e.g., 49 N-m) of negative torque at the wheels, including accounting for transmission gearing.

Positive torque may be transmitted to vehicle wheels 131 in a direction starting at engine 110 and ending at wheels 131. Thus, according to the direction of positive torque flow in driveline 200, engine 110 is positioned in driveline 200 upstream if transmission 125. Transmission 125 is positioned upstream of electric machine 120, and BISG 142 may be positioned upstream of engine 110, or downstream of engine 110 and upstream of transmission 125.

Figure 3:
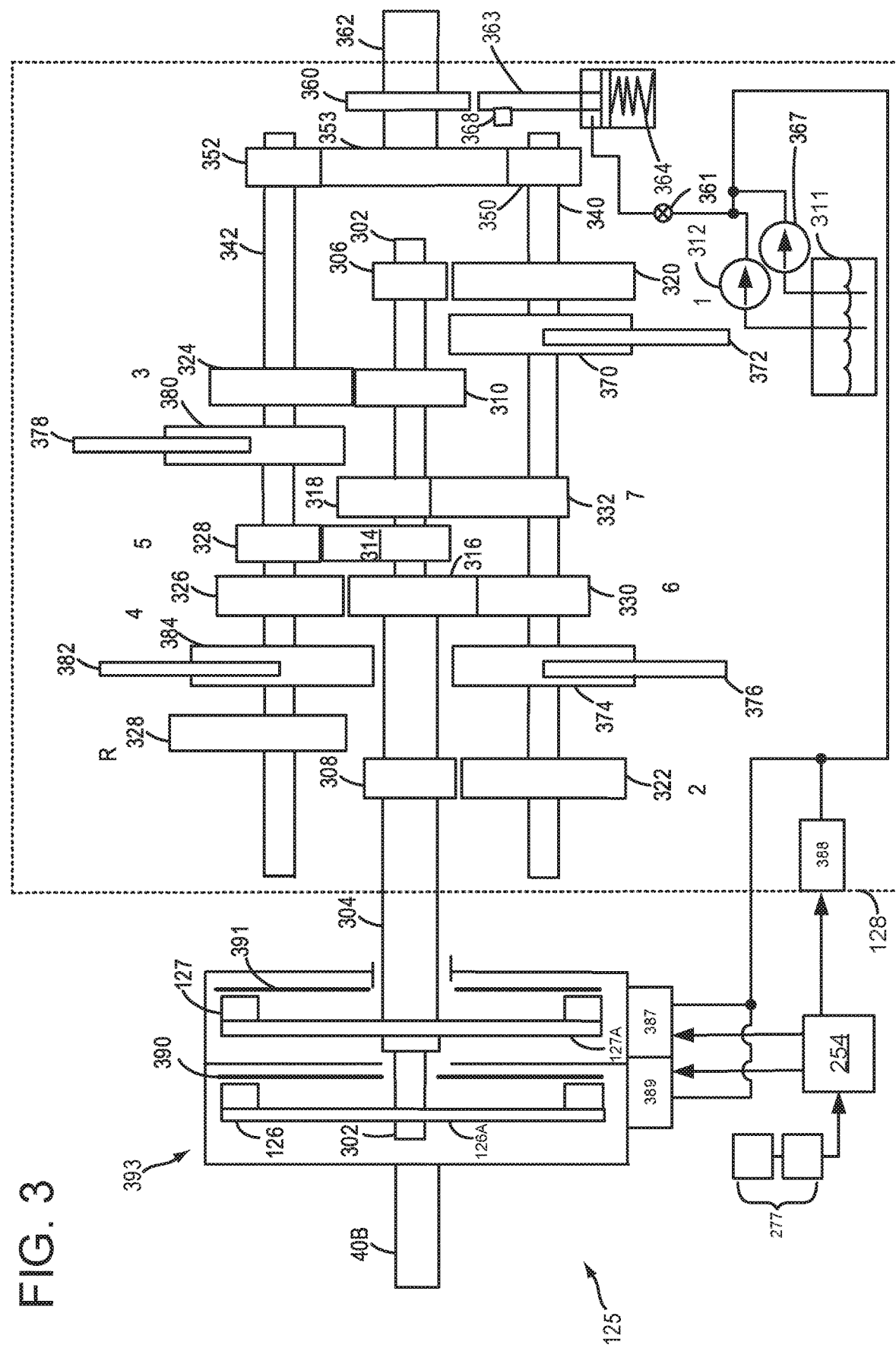
FIG. 3 is a schematic diagram of a dual clutch transmission located in the hybrid vehicle.

FIG. 3 shows a detailed illustration of a dual clutch transmission (DCT) 125. Engine crankshaft 40B is illustrated as coupling to a clutch housing 393. Alternatively, a shaft may couple crankshaft 40B to clutch housing 393. Clutch housing 393 may spin in accordance with rotation of crankshaft 40B. Clutch housing 393 may include a first clutch 126 and a second clutch 127. Furthermore, each of first clutch 126 and second clutch 127 have an associated first clutch plate 390, and a second clutch plate 391, respectively. In some examples, the clutches may comprise wet clutches, bathed in oil (for cooling), or dry plate clutches. Engine torque may be transferred from clutch housing 393 to either first clutch 126 or second clutch 127. First transmission clutch 126 transfers torque between engine 110 (shown in FIG. 1A) and first transmission input shaft 302. As such, clutch housing 393 may be referred to as an input side of first transmission clutch 126 and 126A may be referred to as an output side of first transmission clutch 126. Second transmission clutch 127 transfers torque between engine 110 (shown in FIG. 1A) and second transmission input shaft 304. As such, clutch housing 393 may be referred to as an input side of second transmission clutch 127 and 127A may be referred to as an output side of second transmission clutch 127.

A gear box 128 may include a plurality of gears, as discussed above. There are two transmission input shafts, including first transmission input shaft 302, and second transmission input shaft 304. Second transmission input shaft 304 is hollow, while first transmission input shaft 302 is solid, and sits coaxially within the second transmission input shaft 304. As an example, first transmission input shaft 302 may have a plurality of fixed gears. For example, first transmission input shaft 302 may include first fixed gear 306 for receiving first gear 320, third fixed gear 310 for receiving third gear 324, fifth fixed gear 314 for receiving fifth gear 328, and seventh fixed gear 318 for receiving seventh gear 332. In other words, first transmission input shaft 302 may be selectively coupled to a plurality of odd gears. Second transmission input shaft 304 may include second fixed gear 308 for receiving second gear 322, or a reverse gear 328, and may further include fourth fixed gear 316, for receiving either fourth gear 326 or sixth gear 330. It may be understood that both first transmission input shaft 302 and second transmission input shaft 304 may be connected to each of first clutch 126 and second clutch 127 via spines (not shown) on the outside of each shaft, respectively. In a normal resting state, each of first clutch 302 and second clutch 304 are held open, for example via springs (not shown), etc., such that no torque from engine (e.g. 110) may be transmitted to first transmission input shaft 302 or second transmission input shaft 304 when each of the respective clutches are in an open state. Responsive to closing first clutch 126, engine torque may be transmitted to first transmission input shaft 302, and responsive to closing second clutch 127, engine torque may be transmitted to second transmission input shaft 304. During normal operation, transmission electronics may ensure that only one clutch is closed at any given time.

Gear box 128 may further include a first layshaft shaft 340, and second layshaft shaft 342. Gears on first layshaft shaft 340 and second layshaft shaft 342 are not fixed, but may freely rotate. In example DCT 125, first layshaft shaft 340 includes first gear 320, second gear 322, sixth gear 330, and seventh gear 332. Second layshaft shaft 342 includes third gear 324, fourth gear 326, fifth gear 328, and reverse gear 328. Both first layshaft shaft 340 and second layshaft shaft 342 may transfer torque via a first output pinion 350, and a second output pinion 352, respectively, to gear 353. In this way, both layshafts may transfer torque via each of first output pinion 350 and second output pinion 352, to output shaft 362, where output shaft may transfer torque to a rear drive unit 136 (shown in FIG. 1A) which may enable each of the driven wheels (e.g. 131 of FIG. 1A) to rotate at different speeds, for example when performing turning maneuvers.

As discussed above, each of first gear 320, second gear 322, third gear 324, fourth gear 326, fifth gear 328, sixth gear 330, seventh gear 332, and reverse gear 328 are not fixed to layshafts (e.g. 340 and 342), but instead may freely rotate. As such, synchronizers may be utilized to enable each of the gears to match the speed of the layshafts, and may further be utilized to lock the gears. In example DCT 125, four synchronizers are illustrated, for example, first synchronizer 370, second synchronizer 374, third synchronizer 380, and fourth synchronizer 382. First synchronizer 370 includes corresponding first selector fork 372, second synchronizer 374 includes corresponding selector fork 376, third synchronizer 380 includes corresponding third selector fork 378, and fourth synchronizer 384 includes corresponding fourth selector fork 382. Each of the selector forks may enable movement of each corresponding synchronizer to lock one or more gears, or to unlock one or more gears. For example, first synchronizer 340 may be utilized to lock either first gear 320 or seventh gear 332. Second synchronizer 374 may be utilized to lock either second gear 322 or sixth gear 330. Third synchronizer 380 may be utilized to lock either third gear 324 or fifth gear 328. Fourth synchronizer 384 may be utilized to lock either fifth gear 326, or reverse gear 328. In each case, movement of the synchronizers may be accomplished via the selector forks (e.g. 372, 376, 378, and 382) moving each of the respective synchronizers to the desired position.

Movement of synchronizers via selector forks may be carried out via transmission control module (TCM) 254 and shift fork actuators 388, where TCM 254 may comprise TCM 254 discussed above with regard to FIG. 2. Shift fork actuators may be operated electrically, hydraulically, or a combination of electric and hydraulic. Hydraulic power may be provided via pump 312 and/or pump 367. TCM 254 may collect input signals from various sensors, assess the input, and control various actuators accordingly. Inputs utilized by TCM 254 may include but are not limited to transmission range (P/R/N/D/S/L, etc.), vehicle speed, engine speed and torque, throttle position, engine temperature, ambient temperature, steering angle, brake inputs, gear box input shaft speed (for both first transmission input shaft 302 and second transmission input shaft 304), vehicle attitude (tilt). The TCM may control actuators via an open-loop control, to allow for adaptive control. For example, adaptive control may enable TCM 254 to identify and adapt to clutch engagement points, clutch friction coefficients, and position of synchronizer assemblies. TCM 254 may also adjust first clutch actuator 389 and second clutch actuator 387 to open and close first clutch 126 and second clutch 127. First clutch actuator 389 and second clutch actuator 387 may be operated electrically, hydraulically, or a combination of electric and hydraulic. Hydraulic power may be provided via pump 312 and/or pump 367.

As such TCM 254 is illustrated as receiving input from various sensors 277. As discussed above with regard to FIG. 2, the various sensors may include pump output line pressure sensors, transmission hydraulic pressure sensors (e.g. gear clutch fluid pressure sensors), motor temperature sensors, shifter position sensors, synchronizer position sensors, and ambient temperature sensors. The various sensors 277 may further include wheel speed sensors (e.g. 195), engine speed sensors, engine torque sensors, throttle position sensors, engine temperature sensors, steering angle sensors, and inertial sensors (e.g. 199). Inertial sensors may comprise one or more of the following: longitudinal, latitudinal, vertical, yaw, roll, and pitch sensors, as discussed above with regard to FIG. 1A.

Sensors 277 may further include an input shaft speed (ISS) sensor, which may include a magneto-resistive sensor, and where one ISS sensor may be included for each gear box input shaft (e.g. one for first transmission input shaft 302 and one for second transmission input shaft 304). Sensors 277 may further include an output shaft speed sensor (OSS), which may include a magneto-resistive sensor, and may be attached to output shaft 362. Sensors 277 may further include a transmission range (TR) sensor, which may be utilized by the TCM to detect position of selector forks (e.g. 372, 376, 378, 382).

DCT 125 may be understood to function as described herein. For example, when first clutch 126 is actuated closed, engine torque may be supplied to first transmission input shaft 302. When first clutch 126 is closed, it may be understood that second clutch 127 is open, and vice versa. Depending on which gear is locked when first clutch 126 is closed, power may be transmitted via the first transmission input shaft 302 to either first layshaft 340 or second layshaft 342, and may be further transmitted to output shaft 362 via either first pinion gear 350 or second pinion gear 352. Alternatively, when second clutch 127 is closed, power may be transmitted via the second transmission input shaft 304 to either first layshaft 340 or second layshaft 342, depending on which gear is locked, and may be further transmitted to output shaft 362 via either first pinion gear 350 or second pinion gear 352. It may be understood that when torque is being transferred to one layshaft (e.g. first output shaft 340), the other layshaft (e.g. second output shaft 342) may continue to rotate even though only the one shaft is driven directly by the input. More specifically, the non-engaged shaft (e.g. second layshaft 342) may continue to rotate as it is driven indirectly by the output shaft 362 and respective pinion gear (e.g. 352).

DCT 125 may enable preselection of gears, which may thus enable rapid switching between gears with minimal loss of torque during shifting. As an example, when first gear 320 is locked via first synchronizer 340, and wherein first clutch 126 is closed (and second clutch 127 is open), power may be transmitted from the engine to first input shaft 302, and to first layshaft 340. While first gear 320 is engaged, second gear 322 may simultaneously be locked via second synchronizer 374. Because second gear 322 is locked, this may rotate second input shaft 304, where the second input shaft 304 is speed matched to the vehicle speed in second gear. In an alternative case where a gear is pre-selected on the other layshaft (e.g. second layshaft 342), that layshaft will also rotate as it is driven by output shaft 362 and pinion 352.

When a gear shift is initiated by TCM 254, only the clutches need to be actuated to open first clutch 126 and close second clutch 127. Furthermore, outside the TCM, engine speed may be lowered to match the upshift. With the second clutch 127 closed, power may be transmitted from the engine, to second input shaft 304, and to first layshaft 340, and may be further transmitted to output shaft 362 via pinion 350. Subsequent to the shifting of gears being completed, TCM 254 may pre-select the next gear appropriately. For example, TCM 254 may pre-select either a higher or a lower gear, based on input it receives from various sensors 277. In this way, gear changes may be achieved rapidly with minimal loss of engine torque provided to the output shaft 362.

Dual clutch transmission 300 may in some examples include a parking gear 360. A parking pawl 363 may face parking gear 360. When a shift lever is set to park, park pawl 363 may engage parking gear 360. Engagement of parking pawl 363 with parking gear 360 may be accomplished via a parking pawl spring 364, or may be achieved via a cable (not shown), a hydraulic piston (not shown) or a motor (not shown), for example. When parking pawl 363 is engaged with parking gear 360, driving wheels (e.g. 130, 131) of a vehicle may be locked. On the other hand, responsive to the shift lever being moved from park, to another selection (e.g. drive), parking pawl 363 may move such that parking pawl 363 may be disengaged from parking gear 360.

In some examples, an electric transmission pump 312 may supply hydraulic fluid from transmission sump 311 to compress spring 364, in order to release parking pawl 363 from parking gear 360. Electric transmission pump 312 may be powered by an onboard energy storage device (e.g. 132), for example. In some examples, a mechanical pump 367 may additionally or alternatively supply hydraulic fluid from transmission sump 311 to compress spring 364 to release parking pawl 363 from parking gear 360. While not explicitly illustrated, mechanical pump may be driven by the engine (e.g. 110), and may be mechanically coupled to clutch housing 393. A park pawl valve 361 may regulate the flow of hydraulic fluid to spring 364, in some examples.

Thus, the system of FIGS. 1A-3 provides for a system, comprising: an engine; an electric energy storage device; a motor/generator; and a controller including executable instructions stored in non-transitory memory to operate the engine, electric energy storage device, and motor/generator responsive to a plurality of staging groups that are activated at a substantially same time and deactivated asynchronously. The system further comprises additional instructions to deactivate the plurality of staging groups asynchronously according to audible noise levels related to the plurality of staging groups. The system further comprises additional instructions to group vehicle control parameters into a plurality of stages. The system further comprises additional instructions to gradually adjust values of control parameters from values in the plurality of stages to baseline values. The system includes where values of control parameters in the plurality of staging groups increase an amount of charge stored in the battery. The system includes where values of control parameters in the plurality of staging groups increase an upper engine speed threshold value.

Referring now to FIG. 4, a first prophetic vehicle operating sequence is shown. The operating sequence of FIG. 4 may be provided via the system of FIGS. 1A-3 in cooperation with the method of FIG. 6. The plots shown in FIG. 4 occur at the same time and are aligned in time. Vertical lines at times T1-T5 represent times of interest in the sequence.

The first plot from the top of FIG. 4 is a plot of selected vehicle mode versus time. The vertical axis represents selected vehicle operating mode and the selected vehicle operating mode is a base operating mode when trace 402 is at a lower level near the horizontal axis. The vehicle operating mode is a performance mode when trace 402 is at a higher level near the vertical axis arrow. The horizontal axis represents time and time increases from the left side of the plot to the right side of the plot.

The second plot from the top of FIG. 4 is a plot that shows operating state of first stage control parameters. The first stage of control parameters is active when trace 404 is at a higher level near the vertical axis arrow. The first stage of control parameters is not active when trace 404 is at a lower level near the horizontal axis. The vertical axis represents operating state of first stage control parameters. The horizontal axis represents time and time increases from the left side of the plot to the right side of the plot.

The third plot from the top of FIG. 4 is a plot that shows operating state of second stage control parameters. The second stage of control parameters is active when trace 406 is at a higher level near the vertical axis arrow. The second stage of control parameters is not active when trace 406 is at a lower level near the horizontal axis. The vertical axis represents operating state of second stage control parameters. The horizontal axis represents time and time increases from the left side of the plot to the right side of the plot.

The fourth plot from the top of FIG. 4 is a plot of engine speed versus time. The vertical axis represents engine speed and engine speed increases in the direction of the vertical axis arrow. The horizontal axis represents time and time increases from the right side of the plot to the left side of the plot. Trace 408 represents engine speed and trace 450 represents an upper engine speed threshold that may not be exceeded by engine speed.

The fifth plot from the top of FIG. 4 is a plot of engine boost pressure (e.g., pressure in the engine intake provided by the engine's turbocharger or supercharger versus time. The vertical axis represents boost pressure and boost pressure increases in the direction of the vertical axis arrow. The horizontal axis represents time and time increases from the right side of the plot to the left side of the plot. Trace 410 represents engine boost pressure and trace 452 represents an upper engine boost pressure threshold that may not be exceeded by engine boost pressure.

The sixth plot from the top of FIG. 4 is a plot that shows operating state of the vehicle's suspension. The vehicle suspension is in a performance mode (e.g., stiffer suspension) when trace 412 is at a higher level near the vertical axis arrow. The vehicle suspension is in a base mode (e.g., less stiff or more compliant suspension) when trace 412 is at a lower level near the horizontal axis. The vertical axis represents vehicle suspension operating state. The horizontal axis represents time and time increases from the left side of the plot to the right side of the plot.

At time T0, the engine speed is at a middle level and the engine is rotating and combusting air and fuel. The vehicle is in a base operating mode and the first and second stage control parameters are not activated. The boost pressure is low and the vehicle suspension is in a base mode. In one example, the first stage is comprised of vehicle control variables that are more noticeable to vehicle occupants and the second stage is comprised of vehicle control variables that are less noticeable to vehicle occupants. In this example, the upper engine speed threshold 450 and the vehicle suspension operating state 412 are included within the first stage. Engine speed and vehicle suspension state are included in the first stage since the engine audible noise level is different when the engine is operated at threshold 450 when threshold 450 is a higher level (e.g., between time T1 and time T2) as compared to when the engine is operated at threshold 450 when threshold 450 is a lower level (e.g., between time T0 and time T1). In particular, the engine noise level is higher (e.g., a greater number of decibels) when engine speed is at threshold 450 and threshold 450 is at a higher level. The engine noise level is lower (e.g., a fewer number of decibels) when engine speed is at threshold 450 and threshold 450 is a lower level. Thus, vehicle occupants may find a change in threshold 450 to be noticeable via a change in engine noise. The vehicle suspension setting may also be noticeable to vehicle occupants. In particular, they may find that the vehicle's ride is harsher in performance mode and softer in base mode. Vehicle occupants may notice the vehicle suspension setting by sensing impact from bumps in the road being traveled by the vehicle. Conversely, an increase in boost pressure within the engine may be less noticeable since a pressure change in the engine intake may not be audibly noticeable to vehicle occupants. As such, in this example, the engine speed threshold and the vehicle suspension setting are included in the first stage since higher engine speeds and a stiffer vehicle suspension may be more noticeable to vehicle occupants via the vehicle occupant's senses of sound and touch. Engine boost pressure is included in the second stage since boost pressure may be less noticeable to vehicle occupants.

At time T1, the selected vehicle mode changes from base to performance mode. The vehicle mode may be changed via vehicle occupants applying a switch or the vehicle mode may be automatically changed via a controller responding to vehicle operating conditions, such as driver demand torque. The first stage is activated so the engine speed upper threshold 450 is increased and the vehicle suspension changes to performance mode (e.g., a stiffer vehicle suspension mode). Increasing the engine speed upper threshold allows engine power output to increase. Switching the suspension mode from base to performance stiffens the vehicle's suspension and reduces vehicle body roll when the vehicle negotiates a turn. The second stage is also activated so that the engine boost pressure upper threshold 452 increases to allow higher boost pressures to increase engine torque. By activating the first stage and the second stage, engine power and torque may be increased while switching the suspension mode may allow the vehicle to move through turns at a higher rate of speed.

Between time T1 and time T2, the vehicle driver (e.g., a human or autonomous driver) increases and decreases a driveline torque request several times. Engine speed is allowed to reach threshold 450, which increased at time T1, and boost pressure is allowed to reach threshold 452, which also increased at time T1. Engine speed is not allowed to exceed threshold 450 and boost pressure is not allowed to exceed threshold 452.

At time T2, the first stage is deactivated. In this example, the first stage is deactivated in response to an amount of time since the last time the first stage was activated. Further, in some other examples, the first stage may be deactivated in response to other vehicle operating conditions, driver demand torque being less than a threshold value for longer than a threshold amount of time. Trace 404 transitions to a lower level when the first stage is deactivated. In addition, engine speed upper threshold 450 decreases and the suspension transitions back to a base vehicle suspension mode in response to the first stage being deactivated. The second stage remains activated so that boost pressure is allowed to reach a higher level as compared to the boost pressure upper threshold limit at time T0. By allowing the second stage to remain active, additional engine performance may be made available. Reducing the upper threshold engine speed may reduce the possibility of engine degradation and concerns vehicle occupants may have regarding higher engine speeds. Further, the vehicle suspension mode is reverted back to the base mode may improve the vehicle's ride.

Between time T2 and time T3, the engine speed is limited to less than engine speed upper threshold 450 once engine speed is less than engine speed upper threshold 450 after time T2. Engine speed is limited to less than the engine speed threshold 450 between time T1 and time T2 until engine speed is less than the engine speed threshold 450 between time T2 and time T3. This allows engine speed to be limited without having to force engine speed down at time T2 when engine speed upper threshold 450 is reduced. Boost pressure is limited to boost pressure less than threshold 452 between time T2 and time T3. The vehicle suspension is in the base mode. Thus, the second stage remains activated and the first stage is deactivated.

At time T3, the second stage is deactivated. In this example, the second stage is deactivated in response to an amount of time since the last time the second stage was activated. Further, in some other examples, the second stage may be deactivated in response to other vehicle operating conditions, driver demand torque being less than a threshold value for longer than a second threshold amount of time. Trace 406 transitions to a lower level when the second stage is deactivated. In addition, boost pressure upper threshold 452 decreases in response to the second stage being deactivated. By deactivating the second stage, the possibility of engine degradation may be reduced further. The second stage may be automatically deactivated even though the vehicle driver has not changed the selected vehicle mode. By automatically deactivating the first and second stages, vehicle fuel efficiency may be increased and the possibility of vehicle degradation may be reduced.

At time T4, the vehicle driver switches from performance mode back to base mode as indicated by trace 402 transitioning to a lower level. The engine upper threshold 450, the boost pressure upper threshold 452, and the vehicle suspension state are not adjusted since they have automatically transitioned to their respective base states before time T4. Thus, the first and second stages may be activated and then automatically deactivated without human or automatic driver input. In this way, vehicle efficiency may be increased after higher performance requirements may have subsided.

At time T5, the selected vehicle mode is changed from base to performance mode for a second time. The vehicle mode may be changed via vehicle occupants applying a switch or the vehicle mode may be automatically changed via a controller responding to vehicle operating conditions, such as driver demand torque. The first stage and the second stage are reactivated at a substantially same time (e.g., within one second of each other). The first stage is activated so the engine speed upper threshold 450 is increased and the vehicle suspension changes to performance mode. The second stage is also activated so that the engine boost pressure upper threshold 452 increases to allow higher boost pressures to increase engine torque. By activating the first stage and the second stage, engine power and torque may be increased while switching the suspension mode may allow the vehicle to move through turns at a higher rate of speed.

In this way, a vehicle may enter a performance mode and may transition out of the performance mode via a series of stages which gradually reduce vehicle performance capability but may increase vehicle fuel economy. The stages may include vehicle control parameters to adjust vehicle operating limits and states of vehicle systems.

Referring now to FIG. 5, a second prophetic vehicle operating sequence is shown. The plots shown in FIG. 5 are the same as shown in FIG. 4, except that the parameters or variables within the individual plots are different than those shown in FIG. 4. Therefore, for the sake of brevity the description of each plot is omitted. However, the plots and parameters or variables within the plots are as described in FIG. 4, except as discussed below and as indicated by reference numerals.

At time T10, the engine speed is at a middle level and the engine is rotating and combusting air and fuel. The vehicle is in a base operating mode and the first and second stage control parameters are not activated. The boost pressure is low and the vehicle suspension is in a base mode. In one example, the first stage is comprised of vehicle control variables that are more noticeable to vehicle occupants and the second stage is comprised of vehicle control variables that are less noticeable to vehicle occupants. In this example, the upper engine speed threshold 550 and the vehicle suspension operating state 512 are included within the first stage. Engine speed and vehicle suspension state are included in the first stage since the engine audible noise level is different when the engine is operated at threshold 550 when threshold 550 is a higher level (e.g., between time T11 and time T12) as compared to when the engine is operated at threshold 550 when threshold 550 is a lower level (e.g., between time T10 and time T11). In particular, the engine noise level is higher (e.g., a greater number of decibels) when engine speed is at threshold 550 and threshold 550 is at a higher level. The engine noise level is lower (e.g., a fewer number of decibels) when engine speed is at threshold 550 and threshold 550 is a lower level. Thus, vehicle occupants may find a change in threshold 550 to be noticeable via a change in engine noise. The vehicle suspension setting may also be noticeable to vehicle occupants. In particular, they may find that the vehicle's ride is harsher in performance mode and softer in base mode. Vehicle occupants may notice the vehicle suspension setting by sensing impact from bumps in the road being traveled by the vehicle. Conversely, an increase in boost pressure within the engine may be less noticeable since a pressure change in the engine intake may not be audibly noticeable to vehicle occupants. As such, in this example, the engine speed threshold and the vehicle suspension setting are included in the first stage since higher engine speeds and a stiffer vehicle suspension may be more noticeable to vehicle occupants via the vehicle occupant's senses of sound and touch. Engine boost pressure is included in the second stage since boost pressure may be less noticeable to vehicle occupants.

At time T11, the selected vehicle mode changes from base to performance mode. The vehicle mode may be changed via vehicle occupants applying a switch or the vehicle mode may be automatically changed via a controller responding to vehicle operating conditions, such as driver demand torque. The first stage is activated so the engine speed upper threshold 550 is increased and the vehicle suspension changes to performance mode (e.g., a stiffer vehicle suspension mode). Increasing the engine speed upper threshold allows engine power output to increase. Switching the suspension mode from base to performance stiffens the vehicle's suspension and reduces vehicle body roll when the vehicle negotiates a turn. The second stage is also activated so that the engine boost pressure upper threshold 552 increases to allow higher boost pressures to increase engine torque. By activating the first stage and the second stage, engine power and torque may be increased while switching the suspension mode may allow the vehicle to move through turns at a higher rate of speed.

Between time T11 and time T12, the vehicle driver (e.g., a human or autonomous driver) increases and decreases a driveline torque request several times. Engine speed is allowed to reach threshold 550, which increased at time T11, and boost pressure is allowed to reach threshold 552, which also increased at time T11. Engine speed is not allowed to exceed threshold 550 and boost pressure is not allowed to exceed threshold 552.

At time T12, deactivation of the first stage begins. In this example, the first stage begins to be deactivated by gradually reducing the engine speed upper threshold 552. The deactivation of the first stage may begin in response to an amount of time since the last time the first stage was activated. Further, in some other examples, the first stage may begin to be deactivated in response to other vehicle operating conditions, driver demand torque being less than a threshold value for longer than a threshold amount of time. Trace 504 transitions to a lower level when the deactivation of the first stage begins. In addition, engine speed upper threshold 550 decreases at a predetermined ramping rate (e.g., 10 RPM/second) and the vehicle suspension reverts to base mode in response to beginning to deactivate the first stage. The second stage remains activated so that boost pressure is allowed to reach a higher level as compared to the boost pressure upper threshold limit at time T10. By allowing the second stage to remain active, additional engine performance may be made available. Reducing the upper threshold engine speed may reduce the possibility of engine degradation and concerns vehicle occupants may have regarding higher engine speeds. Further, the vehicle suspension mode is reverted back to the base mode may improve the vehicle's ride. In some examples, the vehicle suspension stiffness may be adjusted to gradually change from the vehicle suspension stiffness of performance mode to the vehicle suspension stiffness of base mode.

Between time T12 and time T13, the engine speed is limited to less than engine speed upper threshold 550 once engine speed is less than engine speed upper threshold 550 after time T12. Engine speed is limited to less than the engine speed threshold 550 between time T11 and time T12 until engine speed is less than the engine speed threshold 550 between time T12 and time T13. This allows engine speed to be limited without having to force engine speed down at time T12 when engine speed upper threshold 550 is reduced. Boost pressure is limited to boost pressure less than threshold 552 between time T12 and time T13. The vehicle suspension is in the base mode. Thus, the second stage remains activated and the first stage is deactivated.

At time T13, the second stage begins to be deactivated. In this example, the second stage begins to be deactivated in response to an amount of time since the last time the second stage was activated. Further, in some other examples, the second stage may begin to be deactivated in response to other vehicle operating conditions, driver demand torque being less than a threshold value for longer than a second threshold amount of time. Trace 506 transitions to a lower level when the second stage begins to be deactivated. In addition, boost pressure upper threshold 552 is decreased gradually at a predetermined ramp rate (e.g., 5 kPa/second or kilopascals/second) in response to the second stage beginning to be deactivated. By deactivating the second stage, the possibility of engine degradation may be reduced further. The second stage may be automatically deactivated even though the vehicle driver has not changed the selected vehicle mode. By automatically deactivating the first and second stages, vehicle fuel efficiency may be increased and the possibility of vehicle degradation may be reduced. The engine speed upper threshold 550 is returned to its base value at time T13.

At time T14, the vehicle driver switches from performance mode back to base mode as indicated by trace 502 transitioning to a lower level. The boost pressure upper threshold 552 is adjusted to its base value at time T14 in response to the vehicle mode change. Thus, the first and second stages may be activated and then automatically deactivated and/or deactivated via human or machine input.

At time T15, the selected vehicle mode is changed from base to performance mode for a second time. The vehicle mode may be changed via vehicle occupants applying a switch or the vehicle mode may be automatically changed via a controller responding to vehicle operating conditions, such as driver demand torque. The first stage and the second stage are reactivated at a substantially same time (e.g., within one second of each other). The first stage is activated so the engine speed upper threshold 550 is increased and the vehicle suspension changes to performance mode. The second stage is also activated so that the engine boost pressure upper threshold 552 increases to allow higher boost pressures to increase engine torque. By activating the first stage and the second stage, engine power and torque may be increased while switching the suspension mode may allow the vehicle to move through turns at a higher rate of speed.

In this way, a vehicle may enter a performance mode and may gradually transition out of the performance mode via a series of stages which gradually reduce vehicle performance capability but may increase vehicle fuel economy. The stages may include vehicle control parameters to adjust vehicle operating limits and states of vehicle systems.

Referring now to FIG. 6, a flowchart of a method for controlling a vehicle driveline is shown. The method of FIG. 6 may be incorporated into and may cooperate with the system of FIGS. 1A-3. Further, at least portions of the method of FIG. 6 may be incorporated as executable instructions stored in non-transitory memory while other portions of the method may be performed via a controller transforming operating states of devices and actuators in the physical world. The method of FIG. 6 may be executed when a vehicle is traveling on a road and responding to vehicle operating conditions including but not limited to driver demand torque, ambient temperature, and ambient pressure.

At 602, method 600 groups vehicle control parameters and/or vehicle control variables into staging groups. In one example, two staging groups may be provided, but the actual total number of staging groups may be greater than two. Vehicle control variables that are judged to be more noticeable by vehicle occupants are included in the first stage and vehicle control variables that are judged to be less noticeable to vehicle occupants are included in the second stage. Thus, vehicle control variables may be arranged in staging groups from more noticeable to less noticeable. One staging group may be activated and deactivated independent of other staging groups to adjust vehicle operation and performance.

Vehicle control parameters that may be determined to be more noticeable are vehicle control variables that may be variables that may affect or may be observed by vehicle occupant's senses including sound, touch, and sight. For example, noticeable vehicle control parameters may include but are not limited to engine speed upper threshold limit (e.g., a rotational speed that engine rotational speed is not to exceed), vehicle suspension mode, vehicle hill descent mode, vehicle speed upper threshold limit (e.g., a speed a vehicle is not to exceed), electric machine speed upper threshold limit (e.g., a rotational speed that an electric machine is not to exceed), transmission gear shift times (e.g., an amount of time it takes from beginning a gear shift to the ending of the gear shift), and number of engine cylinders that may be deactivated (e.g., an actual total number of engine cylinders that may be deactivated to conserve fuel). These more noticeable vehicle control parameter or variables may be grouped into a first stage.

Less noticeable vehicle control parameters may include but are not limited to an engine boost pressure upper threshold limit (e.g., an amount of boost not to be exceeded), a battery state of charge upper threshold limit (e.g., an amount of battery charge not to be exceeded), a battery state of charge lower threshold limit (e.g., an amount of battery charge not to be less than), electric machine temperature upper threshold limit (e.g., a temperature of an electric machine not to be exceeded), and battery temperature threshold upper limit (e.g., a temperature of a battery not to be exceeded). These less noticeable vehicle control parameter or variables may be grouped into a second stage. Method 600 proceeds to 604 after vehicle control parameters are grouped into a plurality of stages.

At 604, method 600 judges if the vehicle is in operation. The vehicle may be judged to be in operation if the vehicle's controllers (e.g., controller 12 shown in FIG. 1A) are activated or if vehicle occupants have activated the vehicle via a key, passive key fob, or other proximity device. The vehicle's engine need not be rotating and combusting air and fuel for the vehicle to be operational. If method 600 judges that the vehicle is operational, the answer is yes and method 600 proceeds to 606. If the vehicle is activated, it may be engaged in a baseline operating mode (e.g., where nominal vehicle operating parameters are the basis for operating and controlling the vehicle) upon the vehicle being activated. Otherwise, the answer is no and method 600 proceeds to exit.

At 606, method 600 judges if conditions have been met to exit the baseline vehicle operating mode. The vehicle baseline operating mode may be departed when a different vehicle operating mode is selected by vehicle occupants or a vehicle controller. Other vehicle operating modes may include but are not limited to performance mode (e.g., increase vehicle power output and track mode suspension settings), hill descent mode (e.g., controlled vehicle speed on a downhill grade), off road mode (e.g., increased vehicle power output and off road suspension settings), and track mode (e.g., increased vehicle power output and stiffened vehicle suspension). In one example, the baseline vehicle operating mode may be departed and a second vehicle operating mode from the vehicle operating modes described may be entered via vehicle occupants selecting a vehicle mode from a human/machine interface. Alternatively, the baseline vehicle operating mode may be departed and a second vehicle operating mode entered in response to vehicle operating conditions such as accelerator pedal position exceeding a threshold and vehicle lateral acceleration exceeding a threshold. Each of the vehicle operating modes may be entered when predetermined unique operating conditions are determined to be present. For example, performance mode may be entered when accelerator pedal position exceeds a threshold and when vehicle lateral acceleration exceeds a threshold. Hill descent mode may be activated when an inclinometer indicates a vehicle is positioned on a hill and pointed downhill while the accelerator pedal is not applied. Off road mode may be entered when vehicle suspension acceleration exceeds a threshold. Track mode may be entered when a global positioning system within the vehicle indicates that the vehicle is operating on a racing track. These vehicle modes and entry conditions are merely exemplary in nature and are not intended to limit the scope of the disclosure. For example, each of the described modes may be entered responsive to conditions other than those mentioned and other vehicle operating modes may also be provided. If method 600 judges that conditions have been met to exit a baseline vehicle operating mode and enter one of the described modes or another mode, the answer is yes and method 600 proceeds to 608. Otherwise, the answer is no and method 600 proceeds to exit.

At 608, method 600 activates control parameters in staging groups that correspond to the vehicle mode being activated. For example, if the selected vehicle mode is performance mode and it includes two stages, control parameters included in the two stages are activated and the vehicle is controlled according to the control parameters. Thus, if the first stage includes an engine speed upper threshold limit, the first stage is activated and engine speed is not permitted to exceed the engine speed upper limit included in the first stage. Likewise, if the second stage includes a battery state of charge upper threshold limit, the second stage is activated and battery state of charge is not permitted to exceed the battery state of charge upper threshold limit.

On the other hand, if the selected vehicle mode is off road mode and it includes three stages, control parameters included in the three stages are activated and the vehicle is controlled according to the control parameters in the three activated stages. Thus, if the first stage includes a vehicle upper threshold speed, the vehicle speed is not permitted to exceed the vehicle upper threshold speed. If the second stage includes an engine boost pressure upper threshold, the engine boost pressure is not permitted to exceed the engine boost pressure upper threshold. If the third stage includes a battery state of charge upper threshold, battery state of charge may be limited so that the battery state of charge upper threshold is not exceeded. Method 600 proceeds to 610.

At 610, method 600 operates the vehicle according to the control parameters included in the activated stages and vehicle operating conditions. For example, the vehicle's engine and electric machine that provides torque to the vehicle driveline may supply a requested driver demand wheel torque, but output of the electric machine and the engine may be limited according to the control parameters included in the activated stages. Further, the vehicle suspension, transmission, axle, and ISG may be operated according to values of control parameters included in the activated stages and vehicle operating conditions. Method 600 proceeds to 612.

At 612, method 600 judges if conditions have been met to deactivate the first stage and its control parameters such that baseline values are activated in place of control parameter values in the first stage. In one example, the first stage and its control parameters may be deactivated in response to a predetermined amount of time since the first stage was most recently activated exceeding a threshold. For example, the first stage may be deactivated 100 seconds after the first stage was most recently activated. In another example, the first stage may be deactivated when driver demand is less than a threshold and when a predetermined amount of time since the first stage was most recently activated exceeds a threshold. In still another example, the first stage may be deactivated in response to vehicle speed exceeding a threshold. Also, the first stage may be deactivated in response to vehicle occupants or a controller switching vehicle mode back to the baseline vehicle operating mode. In still other examples, other vehicle operating conditions may be a basis for deactivating the first stage vehicle control parameters. If conditions are met to deactivate the first stage control parameters, the answer is yes and method 600 proceeds to 614. Otherwise, the answer is no and method 600 returns to 612.

At 614, method 600 phases out the control parameters in the first stage. Method 600 may provide a step change in vehicle control parameters as shown in FIG. 4, or method 600 may gradually adjust engine control parameter values from values included in the first stage to baseline values as shown in FIG. 5. For example, if an engine speed upper threshold limit is 6000 RPM in the first stage and 5500 RPM in the baseline vehicle mode, method 600 may adjust the engine speed upper threshold limit from 6000 RPM to 5500 RPM via a step wise change or via a ramp where the engine speed upper limit is decreased at a predetermined rate until the engine speed upper threshold limit value is equal to the baseline engine speed upper threshold limit of 5500 RPM. Other control parameters in the first staging group are also phased out in this manner. Method 600 proceeds to 616.

At 616, method 600 operates the vehicle according to the control parameters included in the baseline vehicle mode and remaining activated stages (e.g., stage two and three) and vehicle operating conditions. For example, the vehicle's engine and electric machine that provides torque to the vehicle driveline may supply a requested driver demand wheel torque, but output of the electric machine and the engine may be limited according to the control parameters included in the baseline vehicle mode and the stages that remain activated. The vehicle is not operated according to control parameters included in the first stage after values of the control parameters included in the first stage are equal to baseline control parameter values. Thus, the engine speed upper threshold limit may be reduced and engine speed may be limited according to the reduced engine speed upper threshold limit as shown in FIGS. 4-5. Likewise, other control parameters in the first stage may be adjusted back to baseline values. Thus, the engine and electric machine may provide power as commanded by a driver demand, but engine and electric machine power may be limited to baseline control parameter values and control parameter values included in stages other than the first stage (e.g., the second and third stages, if present). Further, the vehicle suspension, transmission, axle, and ISG may be operated according to values of control parameters included in the stages that remain activated and baseline vehicle control parameter that replace values of first stage control parameters. Further, the vehicle components (e.g., engine, transmission, electric machine, etc.) continue to respond to vehicle operating conditions including driver demand torque and requested braking torque. Method 600 proceeds to 617.

At 617, method 600 judges if conditions have been met to reactivate all stages of a vehicle operating mode. The baseline vehicle operating mode may be exited and a non-baseline vehicle operating mode (e.g., performance, track, off road, etc.) may be re-entered with all stages being active responsive to vehicle operating conditions. For example, control parameters of all stages may be reactivated in response to driver demand torque being greater than a threshold for a time period that is longer than a threshold. Further, control parameters of all stages may be reactivated in response to vehicle lateral acceleration being greater than a threshold for a time period that is longer than a threshold. Additionally, other vehicle operating conditions may be used as a basis for reactivating all stages in a particular vehicle operating mode (e.g., track mode, off road mode, performance mode, etc.). If method 600 judges that conditions have been met to reactivate all states of a vehicle operating mode (e.g, the vehicle operating mode determined at 606), the answer is yes and method 600 returns to 608. Otherwise, the answer is no and method 600 proceeds to 618.

At 618, method 600 judges if conditions have been met to deactivate the second stage and its control parameters such that baseline values are activated in place of control parameter values in the second stage. In one example, the second stage and its control parameters may be deactivated in response to a predetermined amount of time since the second stage was most recently activated exceeding a threshold. For example, the second stage may be deactivated 300 seconds after the second stage was most recently activated. In another example, the second stage may be deactivated when driver demand is less than a threshold and when a predetermined amount of time since the second stage was most recently activated exceeds a threshold. In still another example, the second stage may be deactivated in response to vehicle speed exceeding a threshold. Also, the second stage may be deactivated in response to vehicle occupants or a controller switching vehicle mode back to the baseline vehicle operating mode. In still other examples, other vehicle operating conditions may be a basis for deactivating the second stage vehicle control parameters. If conditions are met to deactivate the second stage control parameters, the answer is yes and method 600 proceeds to 622. Otherwise, the answer is no and method 600 returns to 618.

At 620, method 600 phases out the control parameters in the second stage. Method 600 may provide a step change in vehicle control parameters as shown in FIG. 4, or method 600 may gradually adjust engine control parameter values from values included in the second stage to baseline values as shown in FIG. 5. For example, if a battery state of charge upper threshold limit is 80% in the second stage and 70% in the baseline vehicle mode, method 600 may adjust the battery state of charge upper threshold limit from 80% to 70% via a step wise change or via a ramp where the battery state of charge upper threshold limit is decreased at a predetermined rate until the battery state of charge upper threshold limit value is equal to the baseline battery state of charge upper threshold limit of 70%. Other control parameters in the second staging group are also phased out in this manner. Method 600 proceeds to 622.

At 622, method 600 operates the vehicle according to the control parameters included in the baseline vehicle mode and remaining activated stages (e.g., stage three) and vehicle operating conditions. For example, the vehicle's engine, electric machine, and battery that provide torque to the vehicle driveline may supply a requested driver demand wheel torque, but output of the electric machine, battery, and the engine may be limited according to the control parameters included in the baseline vehicle mode and the stages that remain activated. The vehicle is not operated according to control parameters included in the second stage after values of the control parameters included in the second stage are equal to baseline control parameter values. Thus, the battery state of charge upper threshold limit may be reduced and battery charge may be limited according to the reduced battery state of charge upper threshold limit. In this way, the engine, electric machine, and battery may provide power as commanded by a driver demand, but engine, electric machine, and battery output power may be limited to baseline control parameter values and control parameter values included in stages other than the first and second stages (e.g., the third stages, if present). Further, the vehicle suspension, transmission, axle, and ISG may be operated according to values of control parameters included in the stages that remain activated and baseline vehicle control parameter that replace values of first and second stage control parameters. Further, the vehicle components (e.g., engine, transmission, electric machine, etc.) continue to respond to vehicle operating conditions including driver demand torque and requested braking torque. Method 600 proceeds to 624.

At 624, method 600 judges if conditions have been met to reactivate all stages of a vehicle operating mode. The baseline vehicle operating mode may be exited and a non-baseline vehicle operating mode (e.g., performance, track, off road, etc.) may be re-entered responsive to vehicle operating conditions. For example, control parameters of all stages may be reactivated in response to driver demand torque being greater than a threshold for a time period that is longer than a threshold. Further, control parameters of all stages may be reactivated in response to vehicle lateral acceleration being greater than a threshold for a time period that is longer than a threshold. Additionally, other vehicle operating conditions may be used as a basis for reactivating all stages in a particular vehicle operating mode (e.g., track mode, off road mode, performance mode, etc.). If method 600 judges that conditions have been met to reactivate all states of a vehicle operating mode (e.g, the vehicle operating mode determined at 606), the answer is yes and method 600 returns to 608. Otherwise, the answer is no and method 600 proceeds to 626.

At 626, method 600 operates the vehicle according to baseline values of the vehicle control parameters. For example, if the baseline engine speed upper threshold limit is 5000 RPM, the engine is not permitted to exceed 5000 RPM. Thus, the control parameter values associated with the different stages are not activated and the engine is not operated according to these values. The vehicle is also operated responsive to vehicle operating conditions including but not limited to driver demand torque, vehicle speed, engine speed, ambient air pressure, ambient air temperature, and requested braking torque. Method 600 proceeds to exit.

In this way, a vehicle may exit a baseline vehicle operating mode and then reenter the baseline operating mode so that vehicle efficiency may be improved. Further, the vehicle operating mode transitions may be managed to be subtle so that vehicle occupants may find the vehicle mode changes less noticeable.

Thus, the method of FIG. 6 provides for a vehicle operating method, comprising: substantially simultaneously (e.g., activating all stages within on second of each other being activated) activating a plurality of vehicle control parameter staging groups via a controller and operating a vehicle responsive to the plurality of vehicle control parameter staging groups in response to a vehicle mode being selected; and via the controller, deactivating the plurality of vehicle control parameter staging groups asynchronously (e.g., at different times) and operating the vehicle responsive to baseline control parameters responsive to one or more conditions being met. The method includes where deactivating the activated plurality of staging groups asynchronously includes deactivating a first staging group and then deactivating a second staging group after deactivating the first staging group. The method includes where the one or more conditions being met include one or more conditions being met to deactivate the activated plurality of staging groups, and where the second staging group is deactivated a predetermined time after the first staging group is deactivated. The method includes where the first staging group is deactivated a predetermined time after activating the first staging group.

In some examples, the method includes where the first staging group is deactivated in response to a predetermined amount of time after activating the first staging group and driver demand torque being less than a threshold. The method includes where the second staging group is deactivated in response to a predetermined amount of time after deactivating the first staging group and driver demand torque being less than a threshold. The method further comprises grouping the more than one vehicle control parameters into the plurality of staging groups based on observability of the more than one vehicle control parameters via vehicle occupants. The method further comprises grouping a first portion of the more than one vehicle control parameters into a first staging group and grouping a second portion of the more than one vehicle control parameters into a second staging group, the first staging group having a higher level of observability by vehicle occupants than the second staging group. The method includes where deactivating the activated plurality of staging groups asynchronously includes deactivating the first staging group before the second staging group.

The method of FIG. 6 also provides for a vehicle operating method, comprising: grouping more than one vehicle control parameter into a plurality of staging groups via a controller; via the controller, substantially simultaneously activating the plurality of staging groups and operating a vehicle responsive to a vehicle mode being selected; and via the controller, deactivating the activated plurality of staging groups according to a predetermined order of staging group deactivation responsive to one or more conditions being met to deactivate the activated plurality of staging groups. The method includes where the predetermined order is based on observability of individual staging groups in the activated plurality of staging groups. For example, control parameters that may allow for higher vehicle noise levels may be assigned to lower stages (e.g., stage one) and control parameters that are not audible (e.g., battery state of charge thresholds) may be assigned to higher stages (e.g., stage three). The stages may be deactivated in ascending order of stage number. The method includes where the predetermined order deactivates one staging group in the activated plurality of staging groups before other staging groups in the activated plurality of staging groups are deactivated. The method includes where deactivating the activated plurality of staging groups includes gradually adjusting vehicle control parameters from values in the activated plurality of staging groups to base vehicle control parameters. The method includes where the predetermined order of staging group deactivation first deactivates staging groups in the activated plurality of staging groups that are audible to vehicle occupants and then deactivates staging groups in the activated plurality of staging groups that are inaudible to vehicle occupants.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle operating method, comprising:
    substantially simultaneously activating a plurality of vehicle control parameter staging groups via a controller and operating a vehicle responsive to the plurality of vehicle control parameter staging groups in response to a vehicle mode being selected; and
    via the controller, deactivating the plurality of vehicle control parameter staging groups asynchronously and operating the vehicle responsive to baseline control parameters responsive to one or more conditions being met while operating in the vehicle mode,
    where the one or more conditions being met include one or more conditions being met to deactivate the plurality of staging groups, and where a second staging group is deactivated a predetermined time after a first staging group is deactivated, and where vehicle control parameters within the first staging group are ramped at a predetermined rate in response to the first staging group being deactivated,
    wherein the plurality of staging groups are activated asynchronously according to noise levels related to the plurality of staging groups.

2. The method of claim 1, where the first staging group is deactivated a predetermined time after activating the first staging group.

3. The method of claim 1, where the first staging group is deactivated in response to a predetermined amount of time after activating the first staging group and driver demand torque being less than a threshold.

4. The method of claim 1, where the second staging group is deactivated in response to a predetermined amount of time after deactivating the first staging group and driver demand torque being less than a threshold.

5. The method of claim 1, further comprising grouping a plurality of vehicle control parameters into the plurality of staging groups.

6. The method of claim 5, further comprising grouping a first portion of the plurality of vehicle control parameters into the first staging group and grouping a second portion of the plurality of vehicle control parameters into the second staging group.

7. The method of claim 6, where deactivating the plurality of staging groups asynchronously includes deactivating the first staging group before the second staging group.

8. The method of claim 6, wherein the first portion of the plurality of vehicle control parameters includes one or more of an engine rotational speed upper threshold limit, a vehicle suspension mode, a vehicle descent mode, a vehicle speed upper threshold limit, an electric machine rotational speed upper threshold limit, transmission gear shift times, and a number of engine cylinders deactivated.

9. The method of claim 8, wherein the second portion of the plurality of vehicle control parameters includes one or more of an engine boost pressure upper threshold limit, a battery state of charge lower threshold limit, an electric machine temperature upper threshold limit, and a battery temperature threshold upper limit.

10. A vehicle operating method, comprising:
via a controller, grouping more than one vehicle control parameter limits into a plurality of staging groups included in a vehicle mode, the vehicle mode included in a plurality of vehicle modes including a performance mode and a track mode;
via the controller, substantially simultaneously activating the plurality of staging groups and operating a vehicle responsive to a vehicle mode being selected; and
via the controller, deactivating the plurality of staging groups asynchronously according to a predetermined order of staging group deactivation responsive to one or more conditions being met to deactivate the plurality of staging groups,
where the predetermined order of staging group deactivation first deactivates a higher noise staging group of the plurality of staging groups and then deactivates a lower noise staging group in the plurality of staging groups.

11. The method of claim 10, where the predetermined order deactivates one staging group in the plurality of staging groups before other staging groups in the plurality of staging groups are deactivated.

12. The method of claim 10, where deactivating the plurality of staging groups includes gradually adjusting vehicle control parameters from values in the plurality of staging groups to base vehicle control parameters.

13. The method of claim 10, wherein the higher noise staging group has a greater number of decibels than the lower noise staging group.

14. A system, comprising:
an engine;
an electric energy storage device;
a motor/generator; and
a controller including executable instructions stored in non-transitory memory to operate the engine, electric energy storage device, and motor/generator responsive to a plurality of staging groups that are activated at a substantially same time and deactivated asynchronously, and deactivate the plurality of staging groups asynchronously according to noise levels related to the plurality of staging groups.

15. The system of claim 14, further comprising additional instructions to group vehicle control parameters into a plurality of stages.

16. The system of claim 15, further comprising additional instructions to gradually adjust values of control parameters from values in the plurality of stages to baseline values.

17. The system of claim 14, where values of control parameters in the plurality of staging groups increase an amount of charge stored in the electric energy storage device.

18. The system of claim 14, where values of control parameters in the plurality of staging groups increase an upper engine speed threshold value.

19. The system of claim 14, where a second staging group of the plurality of staging groups is deactivated a predetermined time after a first staging group of the plurality of staging groups is deactivated, and where vehicle control parameters within the first staging group are ramped at a predetermined rate in response to the first staging group being deactivated.

* * * * *